US012726743B2

(12) United States Patent
Hasegawa

(10) Patent No.: US 12,726,743 B2
(45) Date of Patent: Sep. 1, 2026

(54) COMMUNICATION DEVICE, COMMUNICATION CONTROL METHOD, AND NON-TRANSITORY COMPUTER-READABLE MEDIUM

(71) Applicant: NEC Corporation, Tokyo (JP)

(72) Inventor: Yohei Hasegawa, Tokyo (JP)

(73) Assignee: NEC CORPORATION, Tokyo (JP)

( * ) Notice: Subject to any disclaimer, the term of this patent is extended or adjusted under 35 U.S.C. 154(b) by 290 days.

(21) Appl. No.: 18/579,580

(22) PCT Filed: Jul. 20, 2021

(86) PCT No.: PCT/JP2021/027203

§ 371 (c)(1), (2) Date: Jan. 16, 2024

(87) PCT Pub. No.: WO2023/002580

PCT Pub. Date: Jan. 26, 2023

(65) Prior Publication Data

US 2024/0305915 A1 Sep. 12, 2024

(51) Int. Cl.
*H04B 10/079* (2013.01)
*H04Q 11/00* (2006.01)

(52) U.S. Cl.
CPC ... *H04Q 11/0062* (2013.01); *H04B 10/07953* (2013.01); *H04B 10/07955* (2013.01);
(Continued)

(58) Field of Classification Search
CPC ........ H04B 10/07953; H04B 10/07955; H04Q 2011/0083; H04Q 2213/13349
(Continued)

(56) References Cited

U.S. PATENT DOCUMENTS 7,684,696 B1 * 3/2010 Hadden .............. H04Q 11/0062 398/25
2007/0270101 A1 * 11/2007 Mourad .................. H04L 1/203 455/67.11
(Continued)

FOREIGN PATENT DOCUMENTS

JP 2001-217775 A 8/2001
JP 2012-244612 A 12/2012
(Continued)

OTHER PUBLICATIONS

International Search Report for PCT Application No. PCT/JP2021/027203, mailed on Oct. 19, 2021.

*Primary Examiner* — Li Liu
(74) *Attorney, Agent, or Firm* — Sughrue Mion, PLLC

(57) ABSTRACT

Provided is a communication device capable of grasping a communication quality status in an optical communication network. The communication device includes: an acquisition unit configured to acquire a plurality of measurement values related to communication quality information in an optical communication network; a calculation unit configured to calculate an average value of measurement values for each first time section based on the plurality of measurement values, determine a variance of the measurement values for each first time section, and determine a reference quality value that is an index value indicating communication quality in the optical communication network based on the average value and the variance; and a determination unit configured to determine whether the communication quality satisfies a required quality value based on the reference quality value.

17 Claims, 18 Drawing Sheets

(52) U.S. Cl.
CPC ................ *H04Q 2011/0083* (2013.01); *H04Q 2213/13349* (2013.01)

(58) Field of Classification Search
USPC ................................................ 398/25–27, 38
See application file for complete search history.

(56) References Cited

U.S. PATENT DOCUMENTS

| | | | | |
|---|---|---|---|---|
| 2008/0193125 | A1* | 8/2008 | Weber | H04B 10/07953 398/25 |
| 2011/0032835 | A1* | 2/2011 | Zhu | H04L 1/20 370/252 |
| 2012/0226727 | A1* | 9/2012 | Zivny | H04L 43/045 708/290 |
| 2012/0230671 | A1* | 9/2012 | Nakada | H04L 1/187 398/1 |
| 2012/0301139 | A1* | 11/2012 | Mori | H04B 10/07953 398/26 |
| 2016/0365934 | A1* | 12/2016 | Maeda | H04B 17/309 |
| 2017/0019795 | A1* | 1/2017 | Takahashi | H04W 16/18 |
| 2017/0099229 | A1* | 4/2017 | Suga | H04L 43/0894 |
| 2018/0337727 | A1* | 11/2018 | Yoshida | H04J 14/021 |
| 2020/0187054 | A1* | 6/2020 | Osuga | H04W 28/10 |
| 2021/0014144 | A1* | 1/2021 | Iwai | H04L 43/04 |
| 2021/0075674 | A1* | 3/2021 | Mansouri Rad | H04B 10/293 |

FOREIGN PATENT DOCUMENTS

| | | | |
|---|---|---|---|
| JP | 2013-197668 | A | 9/2013 |
| JP | 2018-007058 | A | 1/2018 |
| JP | 2018-195997 | A | 12/2018 |

* cited by examiner

COMMUNICATION DEVICE, COMMUNICATION CONTROL METHOD, AND NON-TRANSITORY COMPUTER-READABLE MEDIUM

This application is a National Stage Entry of PCT/JP2021/027203 filed on Jul. 20, 2021, the contents of all of which are incorporated herein by reference, in their entirety.

TECHNICAL FIELD

The present disclosure relates to a communication device, a communication control method, and a non-transitory computer-readable medium.

BACKGROUND ART

In an optical communication system, quality information is used, for example, for monitoring a fault and measuring a parameter in a transmission path (see, for example, Patent Literatures 1 to 3). Patent Literature 1 discloses an optical signal monitoring system that monitors a fault and a quality by performing analog monitoring of a noise deterioration and a waveform distortion of an optical signal on an optical layer. Patent Literature 2 discloses a network control device that predicts an occurrence of a fault in an optical transmission system in advance by correcting an acquired signal quality based on acquired transmission characteristics and detecting a variation in the corrected signal quality. Patent Literature 3 discloses a measurement device that measures a parameter of a transmission path based on a delay time in the transmission path.

CITATION LIST

Patent Literature

Patent Literature 1: Japanese Unexamined Patent Application Publication No. 2001-217775

Patent Literature 2: Japanese Unexamined Patent Application Publication No. 2018-007058

Patent Literature 3: Japanese Unexamined Patent Application Publication No. 2013-197668

SUMMARY OF INVENTION

Technical Problem

Meanwhile, in recent years, in optical communication systems, communication carriers that manage communication infrastructures have been diversified. With the diversification of the communication carriers that manage communication infrastructures, it is necessary to consider not only communication quality but also communication capacity. In order to secure the communication capacity in the communication infrastructure, it is necessary to change a communication setting. On the other hand, when the communication setting is changed, it is necessary to consider not only the communication capacity but also the communication quality. Therefore, the communication carrier changes the communication setting after grasping a communication quality status before and after the change in the communication setting. However, in an optical communication network, since the communication quality status is not always constant, a lot of verification time is required to grasp the communication quality status. Therefore, there is a problem that it is difficult for the communication carrier to grasp the communication quality status in the optical communication network.

In view of the problem described above, an object of the present disclosure is to provide a communication device, a communication control method, and a non-transitory computer-readable medium capable of grasping a communication quality status in an optical communication network.

Solution to Problem

A communication device according to the present disclosure includes:

acquisition means configured to acquire a plurality of measurement values related to communication quality information in an optical communication network;

calculation means configured to calculate an average value of measurement values for each first time section based on the plurality of measurement values, determine a variance of the measurement values for each first time section, and determine a reference quality value based on the average value and the variance, the reference quality value being an index value indicating communication quality in the optical communication network; and determination means configured to determine whether the communication quality satisfies a required quality value based on the reference quality value.

A communication control method according to the present disclosure includes:

acquiring a plurality of measurement values related to communication quality information in an optical communication network;

calculating an average value of measurement values for each first time section based on the plurality of measurement values, determining a variance of the measurement values for each first time section, and determining a reference quality value based on the average value and the variance, the reference quality value being an index value indicating communication quality in the optical communication network; and determining whether the communication quality satisfies a required quality value based on the reference quality value.

A non-transitory computer-readable medium according to the present disclosure is a non-transitory computer-readable medium that stores a program for causing a communication device to execute a communication control method, the communication control method including:

acquiring a plurality of measurement values related to communication quality information in an optical communication network;

calculating an average value of measurement values for each first time section based on the plurality of measurement values, determining a variance of the measurement values for each first time section, and determining a reference quality value based on the average value and the variance, the reference quality value being an index value indicating communication quality in the optical communication network; and determining whether the communication quality satisfies a required quality value based on the reference quality value.

Advantageous Effects of Invention

According to the present disclosure, it is possible to provide a communication device, a communication control method, and a non-transitory computer-readable medium capable of grasping a communication quality status in an optical communication network.

EXAMPLE EMBODIMENTS

Figure 1:
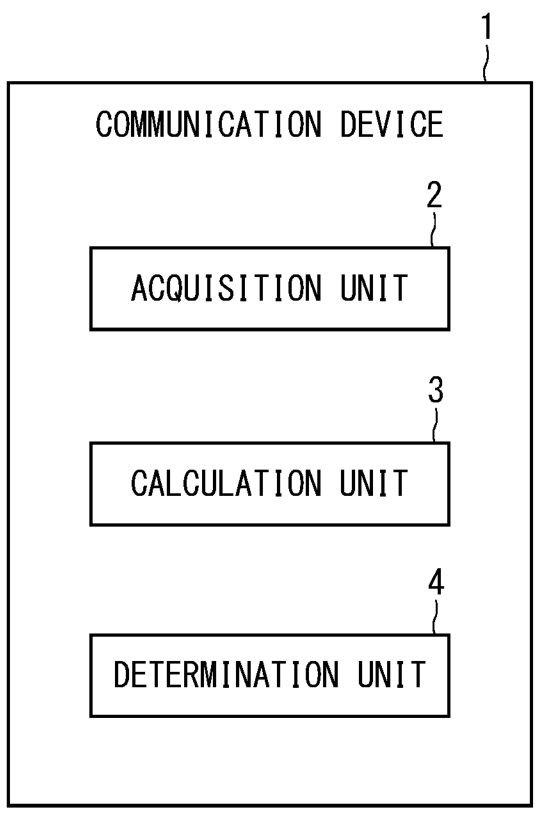
FIG. 1 is a block diagram illustrating an example of a configuration of a communication device according to a first example embodiment.

Hereinafter, example embodiments of the present disclosure will be described with reference to the drawings. Note that, in the following description and drawings, omission and simplification will be made as appropriate for clarity of description. Furthermore, in the following drawings, the same elements will be denoted by the same reference signs, and redundant description will be omitted as necessary.

(Study for Achieving Example Embodiments)

First, before describing example embodiments, the study for achieving the example embodiments will be described.

In order to provide communication services to many users, networks are becoming larger in scale, and in order to efficiently multiplex many communications, networks are becoming highly improving in function. In optical communications as well, it has long been a challenge to efficiently utilize frequency resources of optical communication signals in fibers. Therefore, as a future optical communication scheme, a communication scheme in which optical signal frequency resources are divided (split up) in a short period of time has been studied. Such a communication scheme is called an optical path switch, an optical packet switch, or the like. In such a communication scheme, it is expected to switch on and off an optical communication signal with a very short time granularity.

In addition, in the optical communication network according to the related art as in the above-described patent literature, it is assumed that a communication carrier (operator) grasps all optical communication devices and settings thereof. Therefore, the communication carrier performs careful operation and quality verifications for each of combinations of the optical communication devices and the settings thereof. However, in recent years, communication carriers have been demanding the use of optical communication devices that better meet their own requirements to flexibly change settings thereof.

As described above, in order to obtain the best communication settings in future optical communication networks, the communication carriers are required to dynamically adjust the settings to obtain the best communication performance in situations where there are unknown signal quality fluctuations. Meanwhile, in order to maximize the communication capacity of the entire network, it is preferable for the communication carrier to perform sufficiently optimized settings on each communication device so that each communication device does not unnecessarily increase a transmission output.

However, in the communication schemes such as the optical path switch and the optical packet switch, unlike the optical communication according to the related art, optical communication signals are not regularly generated, and communication signals are transmitted only during communication. In other words, in the communication schemes such as the optical path switch and the optical packet switch, optical packets are intermittently generated. Since the time during which communication signals are transmitted is also limited as described above, in an environment where the communication quality dynamically changes, adjustment of quality measurement and communication settings may not have been sufficiently considered. At this point, the present disclosure realizes a configuration in which, even in an unknown optical communication network, a communication carrier can grasp a communication quality status in the optical communication network in order to enable communication settings corresponding to unknown fluctuations while grasping basic characteristics of the communication quality.

First Example Embodiment

An example of a configuration of a communication device 1 according to a first example embodiment will be described with reference to FIG. 1. FIG. 1 is a block diagram illustrating the example of the configuration of the communication device according to the first example embodiment. The communication device 1 is a communication device constituting an optical communication system. The communication device 1 may be referred to as, for example, an optical transmission device. The communication device 1 includes an acquisition unit 2, a calculation unit 3, and a determination unit 4.

The acquisition unit 2 acquires a plurality of measurement values related to communication quality information in an optical communication network. The communication quality information may be a bit error rate (BER) indicating an error rate before error correction or a Q value indicating an optical quality value. The BER may be a BER based on bits included in a data unit generated from an optical communication signal transmitted through the optical communication network, or may be a BER based on a recovery rate of the data unit generated from the optical communication signal.

The calculation unit 3 calculates an average value of measurement values for each first time section based on the plurality of measurement values acquired by the acquisition unit 2. The calculation unit 3 determines a variance of measurement values for each first time section based on the plurality of measurement values acquired by the acquisition unit 2. In the present specification, the variance may be referred to as a degree of variation, a variation degree, and a fluctuation range of the measurement values. That is, based on the acquired measurement values, the calculation unit 3 calculates degrees of variations among the measurement values.

The first time section is a time section for determining an average value of the measurement values. A length of the first time section may be any value greater than or equal to a minimum measurement interval at which communication quality information can be measured. The length of the first time section may be, for example, from 50 milliseconds to 5 seconds. In optical packet communication, the length of the first time section may be a time for transferring packets equivalent to a switching time. The calculation unit 3 calculates a variance in communication quality information in consideration of a status of fluctuations of the acquired measurement values (characteristics of the measurement values). The calculation unit 3 may determine the variance for each first time section based on the average value for each first time section. Alternatively, the calculation unit 3 may determine the variance for each first time section based on an analysis result of frequency analysis with respect to the plurality of measurement values.

The calculation unit 3 determines a reference quality value that is an index value indicating communication quality in the optical communication network based on the calculated average value and the determined variance. The reference quality value may be, for example, a value of the communication quality information at which a cumulative probability becomes a predetermined value in a cumulative distribution function for the communication quality information. The predetermined value may be a value arbitrarily set by the communication carrier.

The determination unit 4 determines whether the communication quality satisfies a required quality value based on the reference quality value determined by the calculation unit 3. The required quality value may be a minimum value of the communication quality information that can be accepted by the communication carrier as communication quality. In other words, the required quality value may be, for example, a value of the communication quality information that the communication quality should not fall below to satisfy a constraint on an error rate.

Figure 2:
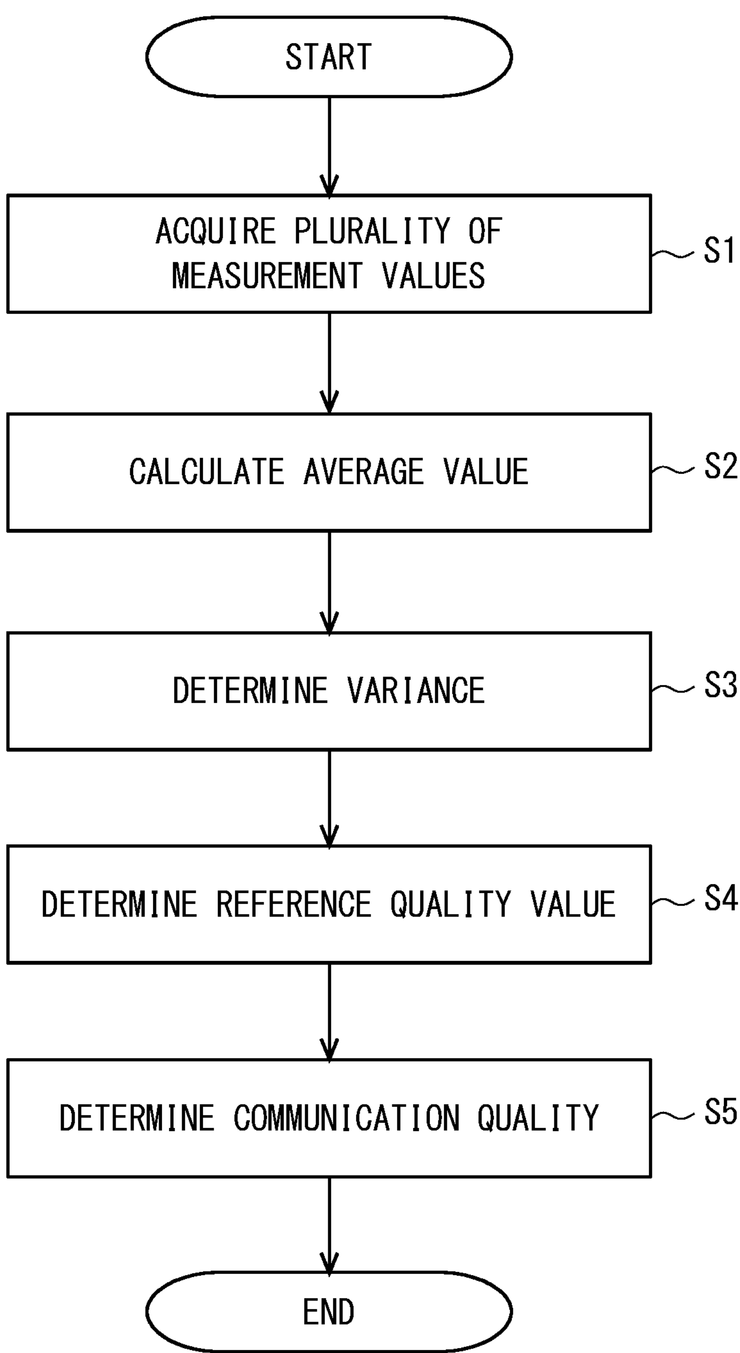
FIG. 2 is a flowchart illustrating an example of an operation of the communication device according to the first example embodiment.

Next, an example of an operation of the communication device 1 according to the first example embodiment will be described with reference to FIG. 2. FIG. 2 is a flowchart illustrating the example of the operation of the communication device according to the first example embodiment.

The acquisition unit 2 acquires a plurality of measurement values for communication quality information in an optical communication network (step S1).

The calculation unit 3 calculates an average value of measurement values for each first time section based on the plurality of measurement values acquired by the acquisition unit 2 (step S2).

The calculation unit 3 determines a variance of the measurement values for each first time section based on the plurality of measurement values acquired by the acquisition unit 2 (step S3).

The calculation unit 3 determines a reference quality value that is an index value indicating communication quality in the optical communication network based on the average value and the variance (step S4).

The determination unit 4 determines whether the communication quality in the optical communication network satisfies a required quality value based on the reference quality value (step S5).

As described above, the communication device 1 calculates, for each first time section, an average value obtained in a short period of time in an optical communication system that is optical packet communication intermittently occurring. The communication device 1 determines the variance for each first time section based on the plurality of measurement values. Since it is expected that the communication quality temporarily fluctuates in the optical packet communication intermittently occurring, the communication device 1 determines the variance in the communication quality information, for example, in consideration of a state of fluctuations among the acquired measurement values (characteristics of the measurement values). Then, the communication device 1 determines whether the communication quality satisfies the required quality by combining the calculated average value with the calculated variance. Therefore, by combining the variance with the average value obtained in a short period of time, the communication device 1 according to the first example embodiment enables the communication carrier to grasp communication quality in the optical communication network.

Second Example Embodiment

Next, a second example embodiment will be described. The second example embodiment is an example embodiment in which the first example embodiment is described in detail.

<Example of Configuration of Optical Communication System>

Figure 3:
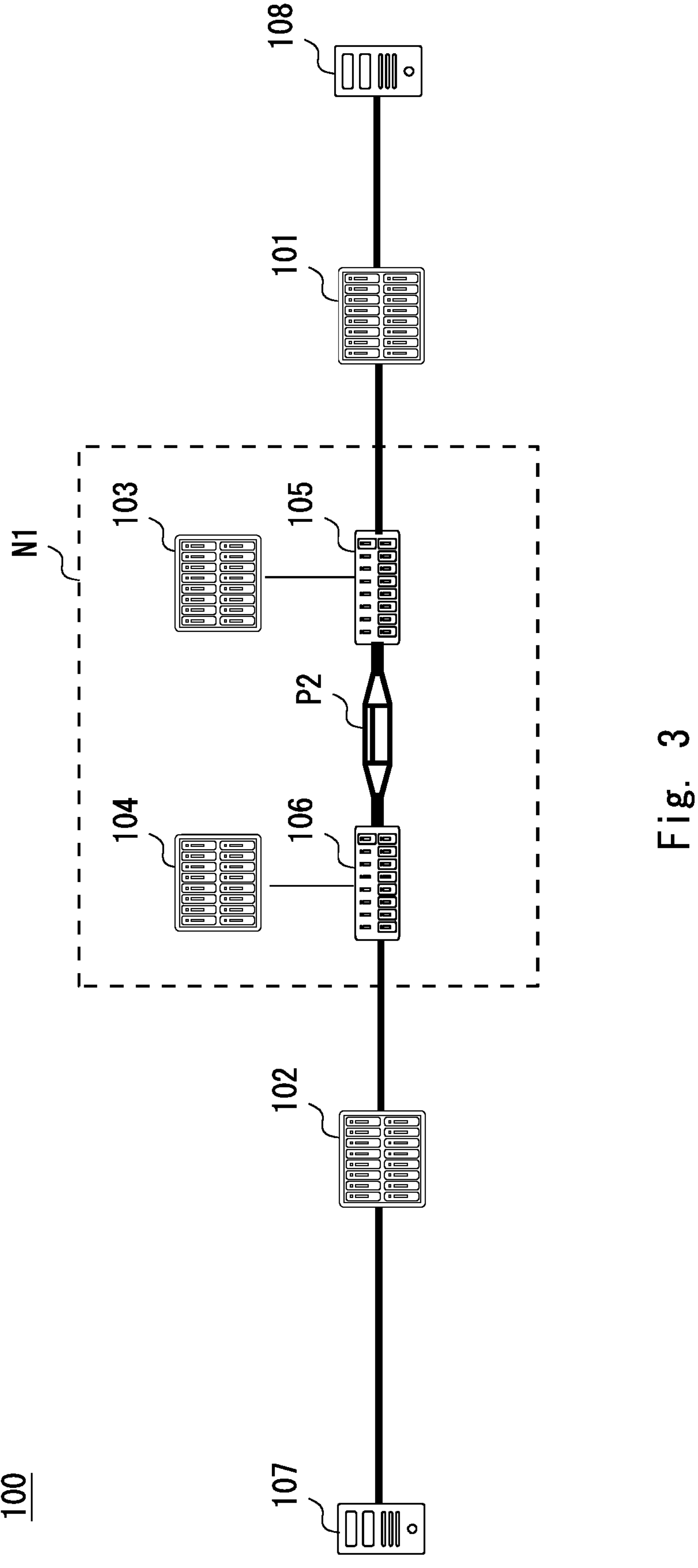
FIG. 3 is a diagram illustrating an example of a configuration of an optical communication system according to a second example embodiment.

An example of a configuration of an optical communication system 100 according to the second example embodiment will be described with reference to FIG. 3. FIG. 3 is a diagram illustrating the example of the configuration of the optical communication system according to the second example embodiment. The optical communication system 100 includes communication devices 101 to 104, optical packet switches (OPS) 105 and 106, and terminal devices 107 and 108.

The communication device 101 corresponds to the communication device 1 according to the first example embodiment. The communication device 101 transfers communication between the terminal device 107 and the terminal device 108 via an optical communication network N1. Specifically, the communication device 101 transfers communication between the terminal device 107 and the terminal device 108 via the optical packet switch 105, an optical communication path P2, and the optical packet switch 106 included in the optical communication network N1. The communication of the communication device 101 is performed intermittently. The communication device 101 receives an optical communication signal transmitted from the communication device 102. The communication device 101 measures communication quality information in the optical communication network N1 and acquires a plurality of measurement values. The communication device 101 controls a communication setting via the communication device 102, based on the plurality of measurement values, so that the communication quality of the optical communication network N1 becomes close to target communication quality. Note that the communication device 102 may receive a plurality of measurement values from the communication device 101, and the communication device 102 may control the communication setting. In the following description, the term "optical communication signal" may be simply described as a "communication signal". In other words, in the following description, the term "communication signal" means an "optical communication signal".

The communication quality information may be a BER indicating an error rate before error correction or a Q value indicating an optical quality value. The BER may be a BER based on bits included in a data unit generated from a communication signal transmitted through the optical communication network N1, or may be a BER based on a recovery rate of the data unit generated from the communication signal.

The communication device 102 transfers communication between the terminal device 107 and the terminal device 108 via the optical communication network N1. Specifically, the communication device 102 transfers communication between the terminal device 107 and the terminal device 108 via the optical packet switch 105, the optical communication path P2, and the optical packet switch 106 included in the optical communication network N1. The communication of the communication device 102 is performed intermittently.

The communication devices 103 and 104 transfer communication between terminal devices that are not illustrated via the optical communication network N1. The communication devices 103 and 104 communicate independently of the communication devices 101 and 102. In other words, the communication devices 103 and 104 intermittently perform communication at timing not grasped by the communication devices 101 and 102. The communication signals transmitted from the communication devices 103 and 104 join the communication signals transmitted from the communication devices 101 and 102 in the optical packet switches 105 and 106, and are transmitted via the optical communication path P2. Note that communication of the communication device 103 is performed intermittently, and when communication signals are transmitted from the communication devices 101 to 103 simultaneously, the communication signals interfere with each other and become noise during communication of the communication devices 101 to 103. Furthermore, the communication of the communication device 104 is performed intermittently, and when optical communication signals are transmitted from the communication devices 101, 102, and 104 simultaneously, the communication signals interferes with each other and become noise during communication of the communication devices 101, 102, and 104.

The optical packet switches 105 and 106 are connected to each other via the optical communication path P2, and perform communication via the optical communication path P2. The optical communication path P2 is configured by, for example, an optical cable such as an optical fiber disposed on the sea floor. The optical packet switches 105 and 106 transfer communication of the communication devices 101 to 104 to a destination communication device. The optical packet switches 105 and 106 are compatible with a wavelength division multiplexing (WDM) scheme, and transmit data transmitted and received through the optical communication path P2 to the opposing optical transmission devices via a plurality of communication channels configured in a plurality of wavelength bands. Each communication channel may be referred to as an optical spectrum.

The terminal devices 107 and 108 are, for example, communication devices provided on land. The terminal devices 107 and 108 may be end user terminals managed by end users, or may be relay devices or the like provided between the end user terminals and the communication devices 102 and 101, respectively. The terminal devices 107 and 108 communicate with each other via the communication devices 101 and 102 and the optical communication network N1. A lines between the terminal device 107 and the communication device 102 and a line between the terminal device 108 and the communication device 101 may be access lines.

<Example of Configuration of Communication Device>

Next, examples of configurations of the communication devices 101 and 102 will be described.

Figure 4:
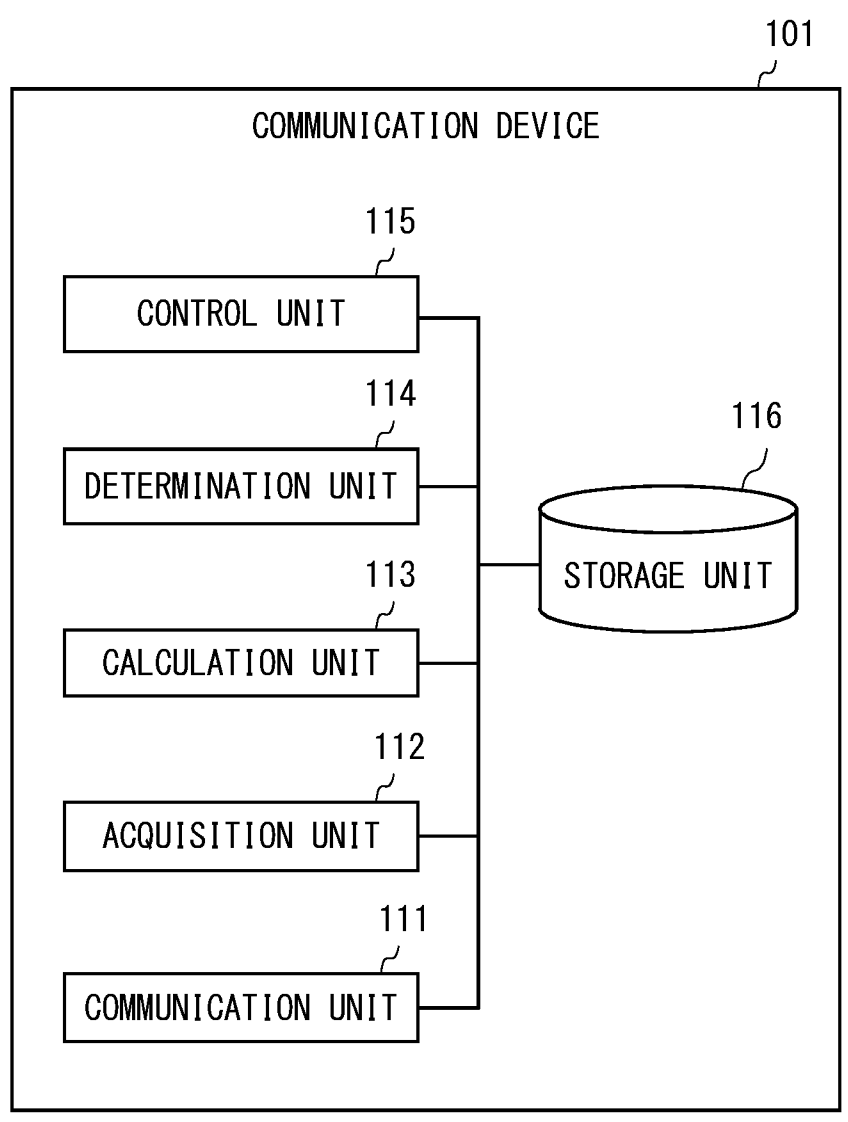
FIG. 4 is a diagram illustrating an example of a configuration of a communication device according to the second example embodiment.

First, an example of a configuration of the communication device 101 will be described with reference to FIG. 4. FIG. 4 is a diagram illustrating the example of the configuration of the communication device according to the second example embodiment. The communication device 101 includes a communication unit 111, an acquisition unit 112, a calculation unit 113, a determination unit 114, a control unit 115, and a storage unit 116.

The communication unit 111 communicates with the communication device 102 and the terminal device 108. The communication unit 111 receives a communication signal from the communication device 102 via the optical communication network N1, and restores a data unit based on a bit string included in the communication signal. The communication unit 111 extracts a communication frame from the data unit and transmits the communication frame to the terminal device 108. The communication unit 111 receives a communication frame from the terminal device 108. The communication unit 111 stores the received communication frame in a data unit, and converts the data unit into a communication signal. The communication unit 111 transmits the communication signal to the communication device 102 via the optical communication network N1. The communication unit 111 transmits the control content determined by the control unit 115 to the communication device 102.

The acquisition unit 112 corresponds to the acquisition unit 2 in the first example embodiment. The acquisition unit 112 acquires a plurality of measurement values related to communication quality information in the optical communication network N1. The acquisition unit 112 acquires the plurality of measurement values by performing measurements regarding communication quality information in the optical communication network N1. In each measurement value, a value of communication quality information and a measurement time are associated with each other. The acquisition unit 112 outputs the plurality of acquired measurement values to the calculation unit 113. The acquisition unit 112 stores the plurality of acquired measurement values in the storage unit 116.

The communication quality information may be a BER indicating an error rate before error correction or a Q value indicating an optical quality value. The BER may be a BER based on bits included in a data unit generated from a communication signal transmitted through the optical communication network N1, or may be a BER based on a recovery rate of the data unit generated from the communication signal.

In a case where the communication quality information is a BER based on bits included in a data unit generated from a communication signal transmitted through the optical communication network N1, the acquisition unit 112 measures a bit string included in the data unit restored by the communication unit 111. The acquisition unit 112 may calculate the BER of the measured bit string, thereby acquiring the calculated BER as a measurement value.

In a case where the communication quality information is a BER based on a recovery rate of the data unit generated from the communication signal, the acquisition unit 112 measures the number of times the communication unit 111 attempts to recover the data unit and the number of times the communication unit 111 succeeds or fails in recovering the data unit. The acquisition unit 112 may calculate the BER based on the number of attempts and the number of successes or the number of failures, and acquire the calculated BER as a measurement value.

In a case where the communication quality information is a Q value, the Q value can be calculated by converting the above-described BER into a logarithmic value. Therefore, the acquisition unit 112 may calculate a Q value by calculating a BER and converting the calculated BER into a logarithmic value. Note that, in the following description, it is assumed that the communication quality information is a Q value.

The calculation unit 113 corresponds to the calculation unit 3 in the first example embodiment. The calculation unit 113 calculates an average value of measurement values for each first time section based on the plurality of measurement values acquired by the acquisition unit 112. The first time section is a time section for calculating the average value of the measurement values. A length of the first time section may be any value greater than or equal to a minimum measurement interval at which a Q value can be measured. The length of the first time section may be, for example, from 50 milliseconds to 5 seconds. In optical packet communication, the length of the first time section may be a time for transferring packets equivalent to a switching time.

In addition, the calculation unit 113 determines a Q-value variance for each first time section based on the plurality of measurement values acquired by the acquisition unit 112. In other words, the calculation unit 113 determines a degree of a variation in the Q value for each first time section based on the acquired measurement values.

The calculation unit 113 determines a reference quality value that is an index value indicating communication quality in the optical communication network N1 based on the calculated average value and the determined variance. The reference quality value may be a Q value at which a cumulative probability becomes a predetermined value ETT in the cumulative distribution function for the Q values. The predetermined value ETT may be a value determined in accordance with communication quality information (Q value) arbitrarily set by the communication carrier.

Here, as described above, in the communication schemes such as the optical path switch and the optical packet switch, it is expected that a communication signal transmitting time is further limited than that in the optical communication system according to the related art. Accordingly, the communication carrier needs to immediately determine a reference quality value. At this point, in the present example embodiment, in order to easily and immediately determine a reference quality value, a margin value M is introduced. By using the margin value M, the reference quality value is easily and immediately determined. The margin value M is a value indicating a difference between the average value of the Q values and the Q value at which the cumulative probability becomes the predetermined value ETT in cumulative probability distribution for the Q values. Therefore, in the present example embodiment, the calculation unit 113 determines a margin value M based on measurement values acquired up to a certain time. Then, the calculation unit 113 determines a reference quality value using an average value based on measurement values acquired after the margin value M is determined, together with the margin value M.

<Processing of Determining Margin Value M>

Hereinafter, determination processing in which the calculation unit 113 determines a margin value M will be described.

The calculation unit 113 calculates an average value for each first time section with respect to measurement values acquired up to a certain time. The calculation unit 113 determines a variance for each first time section based on the average value for each first time section. The calculation unit 113 determines a set T indicating a time for determining a variance for each first time section based on the average value for each first time section, and determines the variance for each first time section based on the measurement values included in the set. The set T is a set of first time sections, and is a set of first time sections selected from among a plurality of first time sections based on the calculated average value.

The calculation unit 113 compares an average value in a first time section for which a determination is to be made among the first time sections with an average value in a first time section for which a comparison is to be made immediately before the first time section for which the determination is to be made. When a difference between the average value in the first time section for which the determination is to be made and the average value in the first time section for which the comparison is to be made is smaller than or equal to a predetermined threshold value, the calculation unit 113 determines a set T so that the first time section for which the determination is to be made is included in the set T. That is, when the average value in the first time section for which the determination is to be made is almost equal to the average value in the first time section for which the comparison is to be made, the calculation unit 113 adds the first time section for which the determination is to be made to the set T.

The calculation unit 113 determines a Q-value variance based on measurement values acquired in the first time sections included in the set T. The calculation unit 113 calculates variances of measurement values for each first time section included in the set T based on the measurement values acquired in the first time sections included in the set T, and determines an average value of the calculated variances as a Q-value variance for each first time section. The calculation unit 113 stores the calculated average value and the calculated variances in the storage unit 116.

Figure 5:
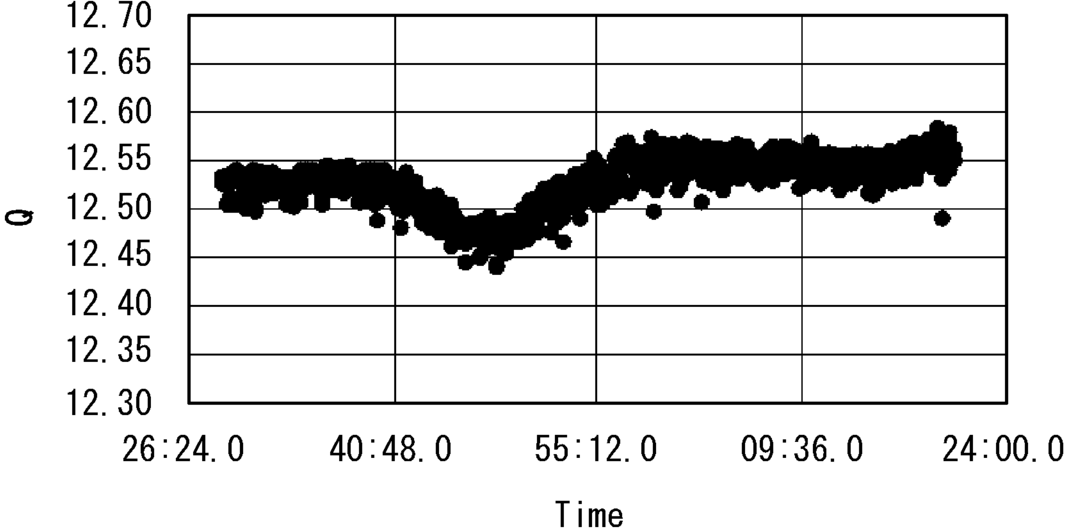
FIG. 5 is a diagram for explaining calculation of an average value and determination of a variance.
Figure 6:
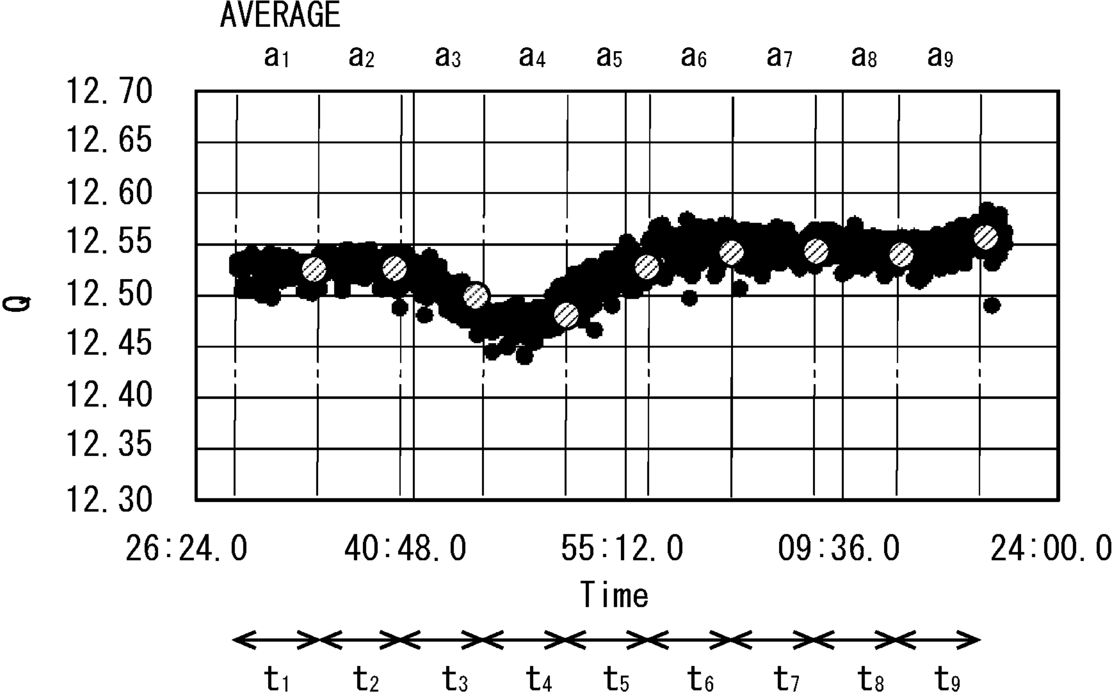
FIG. 6 is a diagram for explaining calculation of an average value and determination of a variance.

Here, an example of the measurement values acquired by the acquisition unit 112, the calculation of the average value and the determination of the variance performed by the calculation unit 113 will be described with reference to FIGS. 5 and 6. FIGS. 5 and 6 are diagrams for explaining the calculation of the average value and the determination of the variance.

FIG. 5 is a diagram illustrating an example of measurement values acquired by the acquisition unit 112. A vertical axis represents a Q value, and a horizontal axis represents a time. In FIG. 5, one black dot represents one measurement value. FIG. 5 illustrates time-based fluctuations of the measurement values for Q values acquired during a measurement time period of about 60 minutes.

As illustrated in FIG. 5, the measured Q values fluctuate up and down in short cycles, and an average value thereof also varies with the lapse of time. In the optical communication system according to the related art, since optical communication signals are regularly transmitted and received during operation, it is not expected that an average value fluctuates with the lapse of time. In contrast, in the communication schemes such as the optical path switch and the optical packet switch, communication signals are not regularly generated, and communication signals are transmitted only during communication. Therefore, as illustrated in FIG. 5, it is expected that Q values fluctuate in short cycles, and an average value thereof also varies with the lapse of time. In addition, in the communication schemes such as the optical path switch and the optical packet switch, it is expected that a communication signal transmitting time is further limited than that in the optical communication system according to the related art. At this point, even in a case where the optical communication system is compatible with the communication schemes such as the optical path switch and the optical packet switch and results of measuring communication quality information (measurement values) are not regularly generated, the calculation unit 113 processes the measurement values, as illustrated in FIG. 6, so that the optical communication system can estimate communication quality.

Next, FIG. 6 will be described. FIG. 6 is a diagram illustrating the processing content performed by the calculation unit 113 on the measurement values described in FIG. 5.

First, the calculation unit 113 calculates an average value of measurement values for each first time section. In FIG. 6, each of times $t_1$ to $t_9$ represents a first time section, and the calculation unit 113 classifies the acquired measurement values into the first time sections, and calculates average values $a_1$ to $a_9$ of the measurement values based on the classified measurement values acquired during the times $t_1$ to $t_9$. In FIG. 6, hatched white circles respectively represent the average values $a_1$ to $a_9$. In optical communication, the calculation unit 113 calculates an average value for each first time section that is a short time granularity by using a feature that an average can be obtained relatively quickly even if there are large and small variations (variances) in the measurement values as illustrated in FIG. 5.

Next, the calculation unit 113 determines a set T for obtaining a variance based on the average values $a_1$ to $a_9$ in the first time sections. The communication quality information including Q values fluctuates in short cycles and an average value thereof also varies with the lapse of time. Thus, if a variance is obtained in a time corresponding to a short time granularity, e.g., a first time section, there is a possibility that the variance cannot be calculated with high accuracy. At this point, the calculation unit 113 determines whether the variance feature of the measurement values is maintained in the optical communication system, and determines a variance based on measurement values in the first time sections during which the variance feature of the measurement values is maintained, thereby determining the variance with high accuracy. That is, the calculation unit 113 determines a variance after determining a set T corresponding to time granularity 2 that is a time granularity longer than time granularity 1 in consideration of a state of fluctuations of the measurement values (characteristics of the measurement values).

The calculation unit 113 determines whether a difference between an average value in a first time section for which a determination is to be made among the plurality of first time sections and an average value in the first time section immediately before the first time section for which the determination is to be made is within a predetermined threshold value. Then, when the difference is smaller than or equal to the predetermined threshold value, the calculation unit 113 determines the set T so that the first time section for which the determination is to be made is included in the set T.

To generalize what has been described above, when a difference between an average value $a_i$ in a first time section $t_i$ and an average value $a_{i-1}$ in an immediately preceding first time section $t_{i-1}$ is smaller than or equal to the predetermined threshold value, the calculation unit 113 adds the first time section $t_i$ to the set T. This can be represented by Formula (1), and thus, the calculation unit 113 determines the set T according to Formula (1). Note that the predetermined threshold value may be any set threshold value.

[Mathematical Expression 1]

$$T \ni \forall t_i \quad \text{s.t. } a_i \approx a_{i-1} \tag{1}$$

To give explanation using the example illustrated in FIG. 6, the average value $a_2$ is a value almost equal to the average value $a_1$, the average value $a_7$ is a value almost equal to the average value $a_6$, and the average value as is a value almost equal to the average value $a_7$. Therefore, the calculation unit 113 adds the times $t_2$, $t_7$, and $t_8$, which are first time sections in which the average values $a_2$, $a_7$, and as are obtained, to the set T. That is, the calculation unit 113 determines the set T as $T=\{t_2, t_7, t_8\}$.

Next, the calculation unit 113 determines a Q-value variance in the first time section based on the measurement values included in the determined set T. Specifically, the calculation unit 113 calculates variances based on the measurement values in the first time sections included in the set T, and determines an average value of the calculated variances as a Q-value variance in the first time section.

To generalize what has been described above, a variance of measurement values in a first time section $t_i$ included in a set T indicating a second time section is defined as a variance bi, and a variance of the measurement values determined by the calculation unit 113 is defined as a variance represented by Expression 2.

[Mathematical Expression 2]

$$\bar{b}$$

Then, the calculation unit 113 determines a Q-value variance by using Formula (2).

[Mathematical Expression 3]

$$\bar{b} = avg\{\forall b_i\} \quad \text{s.t. } T \ni t_i \tag{2}$$

To give explanation using the example illustrated in FIG. 6, since the set T indicating the second time section is T={$t_2$, $t_7$, $t_8$}, the calculation unit 113 determines a variance represented by Expression 4 of the measurement values in the first time sections according to Expression 5.

[Mathematical Expression 4]

$$\bar{b}$$

[Mathematical Expression 5]

$$\bar{b} = avg\{b_2, b_7, b_8\}$$

After calculating the average value for each first time section and determining the variance for each first time section, the calculation unit 113 estimates a cumulative distribution function for the Q values based on the calculated average value and the determined variance. Based on the calculated average value and the determined variance for each first time section included in the set T, the calculation unit 113 estimates a cumulative distribution function for the Q values based on the measurement values for each first time section. The calculation unit 113 estimates the cumulative distribution function by performing fitting to the Gaussian distribution based on the calculated average value and the determined variance. The calculation unit 113 estimates the cumulative distribution function for the Q values based on the measurement values for each first time section, by obtaining cumulative distribution function according to the Gaussian distribution based on the determined variance, while the average value calculated for each first time section included in the set T is set as a Q value at which the cumulative probability becomes 0.5.

When estimating the cumulative probability distribution for the Q values based on the measurement values for each first time section included in the set T, the calculation unit 113 calculates a margin value $M_i$ for each first time section included in the set T. The calculation unit 113 determines (or calculates) an average value of the margin values $M_i$ calculated based on the measurement values in all the first time sections included in the set T as a final margin value M.

Figure 7:
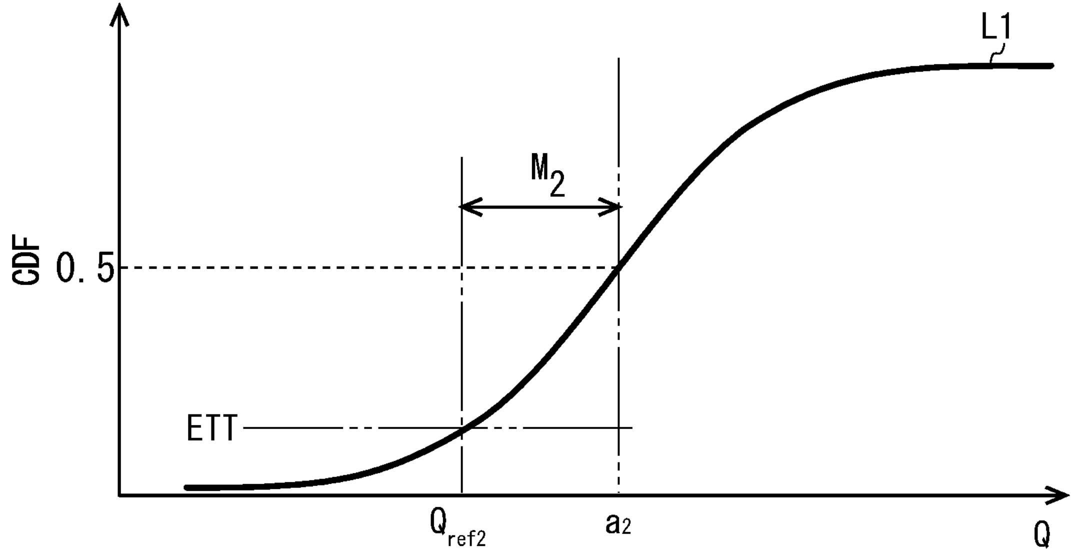
FIG. 7 is a diagram for explaining a method of calculating a margin value.

Here, a method by which the calculation unit 113 calculates a margin value M will be described with reference to FIG. 7. FIG. 7 is a diagram for explaining a method of calculating a margin value. The calculation unit 113 estimates a cumulative distribution function for the Q values based on the calculated average value and the determined variance for each first time section included in the set T. FIG. 7 is a diagram for explaining a specific example using the average value $a_2$ in the time $t_2$ among the first time sections included in the set T. A curved line L1 illustrated in FIG. 7 indicates a cumulative distribution function for the Q values. The calculation unit 113 estimates a cumulative distribution function for the Q values by setting the calculated average value $a_2$ as a value at which the cumulative probability becomes 0.5 and performing fitting to the Gaussian distribution based on the determined variance represented by Expression 6.

[Mathematical Expression 6]

$$\bar{b}$$

Next, the calculation unit 113 obtains a Q value corresponding to a predetermined value ETT of the cumulative probability in the cumulative probability distribution. As illustrated in FIG. 7, in the probability distribution indicated by the curved line L1, when the Q value corresponding to the predetermined value ETT of the cumulative probability is a value $Q_{ref2}$, the calculation unit 113 obtains the value $Q_{ref2}$. The calculation unit 113 calculates a difference between the average value $a_2$ and the value $Q_{ref2}$ as a margin value $M_2$ for the first time section corresponding to the average value $a_2$. For the average values $a_7$ and as in the first time sections included in the set T, the calculation unit 113 also estimates cumulative distribution functions, and calculates margin values $M_7$ and $M_8$. After calculating the margin values $M_7$ and $M_8$, the calculation unit 113 calculates an average value of the margin values $M_2$, $M_7$, and Ms, and determines the average value as a final margin value M. The calculation unit 113 stores the determined margin value M in the storage unit 116. The calculation unit 113 updates the final margin value M as needed using measurement values acquired by the acquisition unit 112. Note that the final margin value M may be calculated by obtaining a moving average of the margin values $M_2$, $M_7$, and $M_8$.

To generalize what has been described above, when a margin value in a first time section $t_i$ included in the set T indicating the second time section is defined as a margin value $M_i$ and a function indicating a cumulative probability distribution is a function f, the calculation unit 113 calculates a margin value $M_i$ in accordance with the following Formula (3). Note that $a_i$ is an average value obtained from measurement values in the first time section $t_i$. The calculation unit 113 obtains an average value of the margin values $M_i$ obtained according to Formula (3), and determines the obtained average value as a final margin value M.

[Mathematical Expression 7]

$$M_i = a_i - Q_{refi} \quad \text{s.t. } f(Q_{refi}) = ETT \tag{3}$$

<Processing of Determining Reference Quality Value>

Next, the processing of determining a reference quality value will be described.

After determining the margin value M, the calculation unit 113 determines a reference quality value using the margin value M while updating the margin value M based on acquired measurement values in the same manner as described above. For example, when measurement values are acquired in a first time section after the margin value M is determined, the calculation unit 113 calculates an average value of the measurement values in the first time section based on the measurement values in the first time section. The calculation unit 113 determines a value obtained by subtracting the margin value M from the calculated average value as the reference quality value. Thus, the calculation unit 113 can determine a reference quality value based on the margin value M and the average value in the first time section after the margin value M is determined as described above. Therefore, the reference quality value can be determined easily and immediately.

Returning to FIG. 4, the determination unit 114 will be described. The determination unit 114 corresponds to the determination unit 4 in the first example embodiment. The determination unit 114 determines whether the communication quality in the optical communication network N1 satisfies a required quality value $Q_{w.Err}$ based on the reference quality value determined by the calculation unit 113. The required quality value $Q_{w.Err}$ may be a minimum value of communication quality information that can be accepted by the communication carrier as communication quality. In other words, the required quality value $Q_{w.Err}$ may be, for example, a value of communication quality information that the communication quality should not fall below to satisfy a constraint on an error rate.

When the reference quality value exceeds the required quality value, the determination unit 114 determines that the communication quality in the optical communication network N1 satisfies the required quality value. On the other hand, when the reference quality value does not exceed the required quality value, the determination unit 114 determines that the communication quality in the optical communication network N1 does not satisfy the required quality value.

Based on a determination result of the determination unit 114, the control unit 115 changes a communication setting in the optical communication network N1 so that the communication quality satisfies the required quality value. When determining the control content, the control unit 115 transmits the control content to the communication device 102 via the communication unit 111, and changes the communication setting in the optical communication network N1 via the communication device 102.

When the reference quality value exceeds the required quality value, the control unit 115 executes a control to increase the communication speed of the communication signal transmitted in the optical communication network N1. Specifically, the control unit 115 executes a control to reduce the strength of an error correction code of the communication signal or reduce a transmission output of the communication device 102 that transmits the communication signal.

When the reference quality value does not exceed the required quality value, the control unit 115 executes a control to reduce the communication speed of the communication signal transmitted in the optical communication network N1. Specifically, the control unit 115 executes a control to increase the strength of the error correction code of the communication signal or increase the transmission output of the communication device 102 that transmits the communication signal. Note that, when the transmission output is increased, the communication speed can be reduced because the communication amount per transmission output is reduced while the total amount of transmission outputs is limited in many cases.

The storage unit 116 stores the measurement values acquired by the acquisition unit 112. The storage unit 116 stores the average value for each first time section calculated by the calculation unit 113 and the calculated variance. The storage unit 116 stores the margin value M determined by the calculation unit 113.

Figure 8:
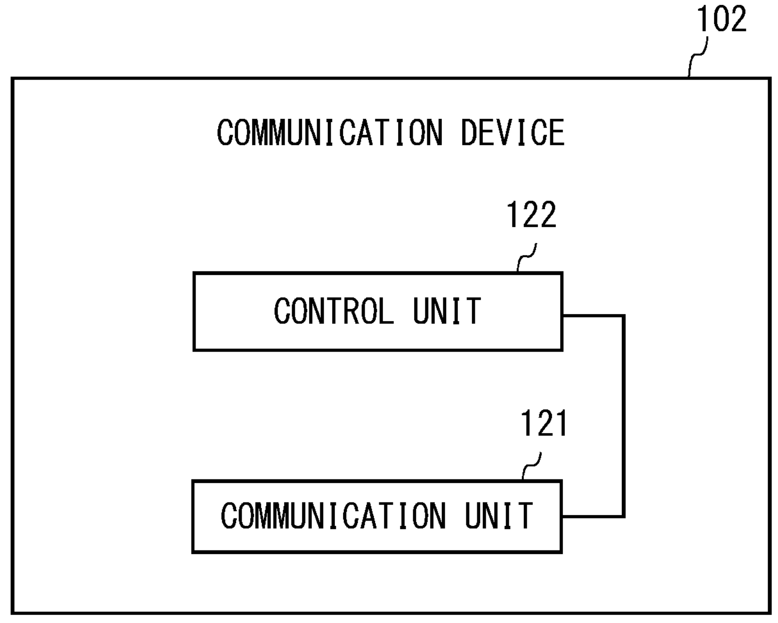
FIG. 8 is a diagram illustrating an example of a configuration of a communication device according to the second example embodiment.

Next, an example of a configuration of the communication device 102 will be described with reference to FIG. 8. FIG. 8 is a diagram illustrating the example of the configuration of the communication device according to the second example embodiment. The communication device 102 includes a communication unit 121 and a control unit 122.

The communication unit 121 communicates with the communication device 101 and the terminal device 107. The communication unit 121 receives a communication signal from the communication device 101 via the optical communication network N1, and restores a data unit based on a bit string included in the communication signal. The communication unit 121 extracts a communication frame from the data unit and transmits the communication frame to the terminal device 107. The communication unit 121 receives a communication frame from the terminal device 107. The communication unit 121 stores the received communication frame in a data unit, and converts the data unit into a communication signal. The communication unit 121 transmits the communication signal to the communication device 101 via the optical communication network N1. The communication unit 121 receives the control content determined by the control unit 115 from the communication device 101, and transmits the control content to the control unit 122.

The control unit 122 receives the control content determined by the control unit 115 from the communication unit 121. The control unit 122 executes a control according to the control content determined by the control unit 115 and changes the communication setting in the optical communication network N1.

<Example of Operation of Optical Communication System>

Figure 9:
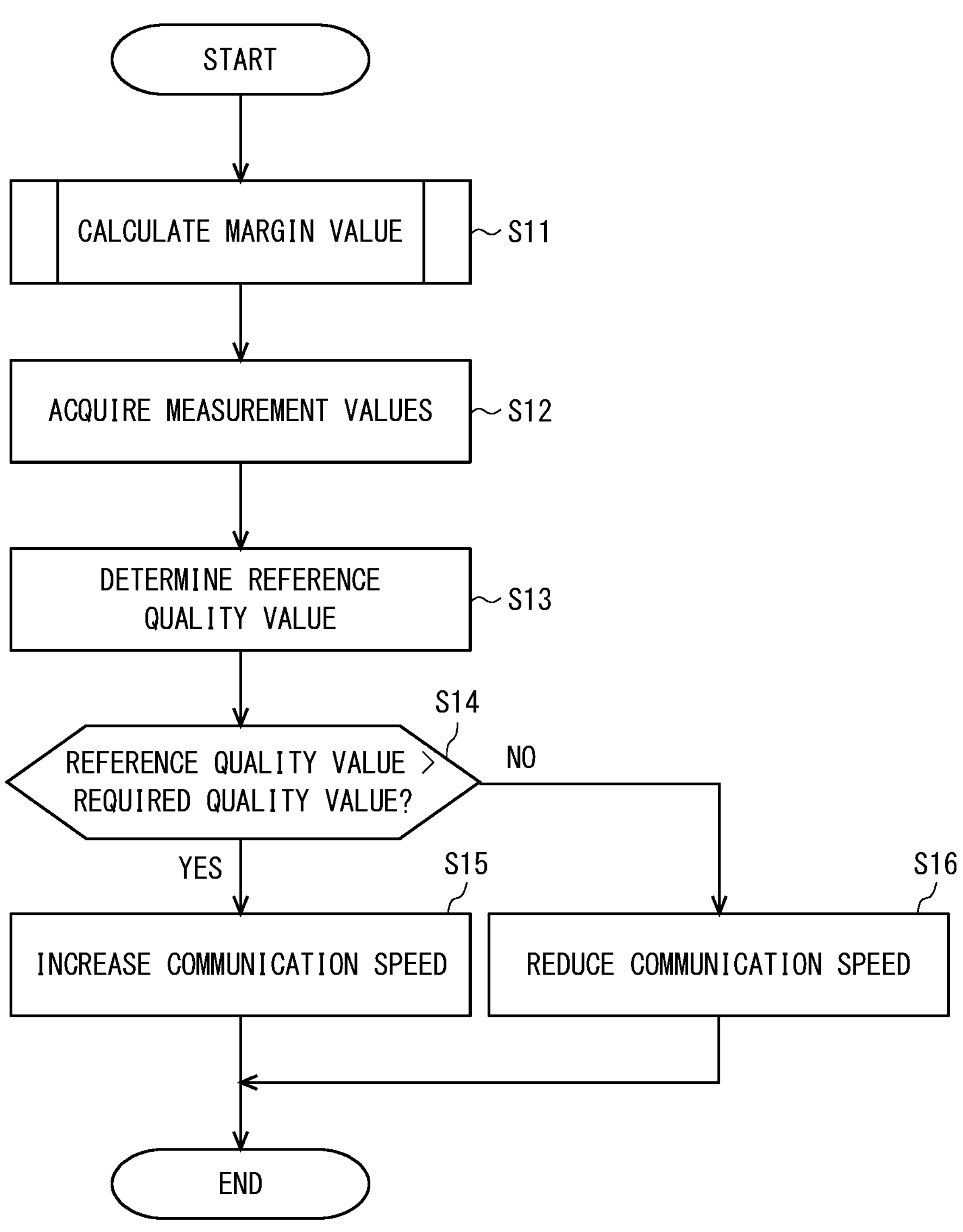
FIG. 9 is a flowchart illustrating an example of an operation of the optical communication system according to the second example embodiment.
Figure 10:
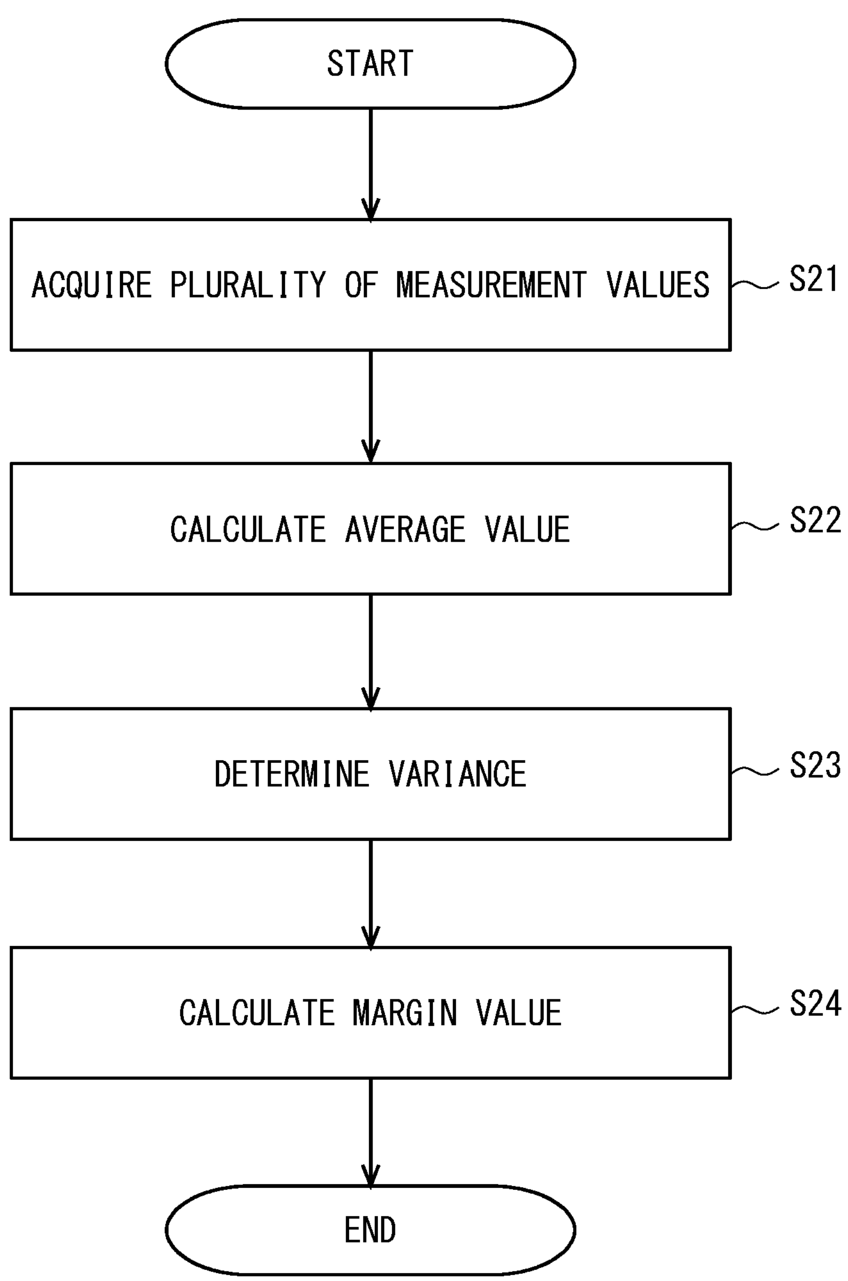
FIG. 10 is a flowchart illustrating an example of an operation of the optical communication system according to the second example embodiment.

Next, an example of an operation of the optical communication system 100 will be described with reference to FIGS. 9 and 10. FIGS. 9 and 10 are flowcharts illustrating the example of the operation of the optical communication system according to the second example embodiment.

First, the overall operation of the optical communication system 100 will be described with reference to FIG. 9. The operation illustrated in FIG. 9 is executed by the communication devices 101 and 102.

The communication device 101 calculates a margin value (step S11). Note that step S11 will be described in detail later with reference to FIG. 10.

The acquisition unit 112 acquires measurement values (step S12).

The calculation unit 113 determines a reference quality value (step S13). The calculation unit 113 calculates an average value for each first time section based on the acquired measurement values. The calculation unit 113 determines a reference quality value based on the calculated average value and the margin value calculated in step S11. The calculation unit 113 determines a value obtained by subtracting the margin value from the calculated average value as the reference quality value. Note that, in step S13, the calculation unit 113 updates the margin value based on acquired measurement values, and determines a reference quality value using the updated margin value.

The determination unit 114 determines whether the reference quality value is larger than the required quality value (step S14). By determining whether the reference quality value is larger than the required quality value, the determination unit 114 determines whether the communication quality in the optical communication network N1 satisfies the required quality value.

When the reference quality value is larger than the required quality value (YES in step S14), the determination unit 114 determines that the communication quality in the optical communication network N1 satisfies the required quality value, and the control unit 115 executes step S15.

On the other hand, when the reference quality value is not larger than the required quality value (NO in step S14), the determination unit 114 determines that the communication quality in the optical communication network N1 does not satisfy the required quality value, and the control unit 115 executes step S16.

In step S15, the control unit 115 increases the communication speed (step S15). The control unit 115 executes a control to increase the communication speed by reducing the strength of an error correction code of the communication signal transmitted in the optical communication network N1 or reducing a transmission output of the communication device 102 that transmits the communication signal. The control unit 115 transmits the control content related to the control to the communication device 102 via the communication unit 111. The control unit 122 changes the communication setting in the optical communication network N1 based on the control content received from the communication device 101.

In step S16, the control unit 115 reduces the communication speed (step S16). The control unit 115 executes a control to reduce the communication speed by increasing the strength of the error correction code of the communication signal transmitted in the optical communication network N1 or increasing the transmission output of the communication device 102 that transmits the communication signal. The control unit 115 transmits the control content related to the control to the communication device 102 via the communication unit 111. The control unit 122 changes the communication setting in the optical communication network N1 based on the control content received from the communication device 101.

After the communication device 101 and the communication device 102 execute steps S15 and S16, the processing ends. Note that, although FIG. 9 is a flowchart in which the processing ends after step S15 or S16 is executed, the communication devices 101 and 102 may return to step S12 and continue the processing when the execution of step S15 or S16 is completed. Alternatively, when the execution of step S15 or S16 is completed, the communication devices 101 and 102 may execute the flowchart illustrated in FIG. 9 again.

Next, step S11 of FIG. 9 will be described in detail with reference to FIG. 10. The operation illustrated in FIG. 10 is executed by the communication device 101.

The acquisition unit 112 acquires a plurality of measurement values related to Q values in the optical communication network N1 (step S21).

The calculation unit 113 calculates an average value of measurement values for each first time section based on the plurality of measurement values acquired by the acquisition unit 112 (step S22).

The calculation unit 113 determines a Q-value variance for each first time section based on the plurality of measurement values acquired by the acquisition unit 112 (step S23). The calculation unit 113 determines a set T for determining a variance based on the average value for each first time section. When a difference between the average value in the first time section for which the determination is to be made and the average value in the first time section for which the comparison is to be made is smaller than or equal to a predetermined threshold value, the calculation unit 113 determines a set T so that the first time section for which the determination is to be made is included in the set T. The calculation unit 113 calculates a variance of measurement values for each first time section included in the set T based on the measurement values for each first time section included in the set T, and determines an average value of the calculated variances as a Q-value variance in the first time section.

The calculation unit 113 calculates a margin value M (step S24). The calculation unit 113 estimates a cumulative distribution function for the Q values based on the calculated average value and the determined variance for each first time section. The calculation unit 113 calculates a margin value $M_i$, based on the calculated average value and the determined variance, for each first time section included in the set T. The calculation unit 113 obtains an average value of the margin values $M_i$, and determines the obtained average value as a final margin value M.

As described above, the calculation unit 113 calculates an average value of measurement values for each first time section. The calculation unit 113 determines a variance for each first time section based on the average value of the measurement values for each first time section in consideration of a state of fluctuations among the acquired measurement values (characteristics of the measurement values), and determines a reference quality value. Using the reference quality value, the determination unit 114 determines whether the communication quality in the optical communication network N1 satisfies the required quality value. Therefore, the communication device 101 according to the second example embodiment enables the communication carrier to grasp communication quality in the optical communication network.

In addition, the calculation unit 113 calculates a margin value M for determining whether the communication quality satisfies the required quality by combining the average value with the variance. After determining the margin value M, the calculation unit 113 can determine a reference quality value by calculating an average value for each first time section and subtracting the margin value M from the average value. Therefore, the communication device 101 according to the second example embodiment is capable of easily and immediately determining communication quality in the optical communication network. Furthermore, since the calculation unit 113 can easily and immediately determine a reference quality value using the margin value M, the determination unit 114 can also easily and immediately determine that the communication quality satisfies the required quality value using the reference quality value.

Third Example Embodiment

Next, a third example embodiment will be described. The third example embodiment is different from the second example embodiment in processing of determining a Q-value variance for each first time section. Note that, in a configuration of an optical communication system according to the third example embodiment, the communication device 101 in the second example embodiment is merely replaced with a communication device 201 to be described later. Therefore, in the present example embodiment, the description of the configuration of the optical communication system will be omitted as appropriate, by appropriately omitting the content common to that in the second example embodiment in describing an example of a configuration of the communication device 201.

<Example of Configuration of Communication Device>

Figure 11:
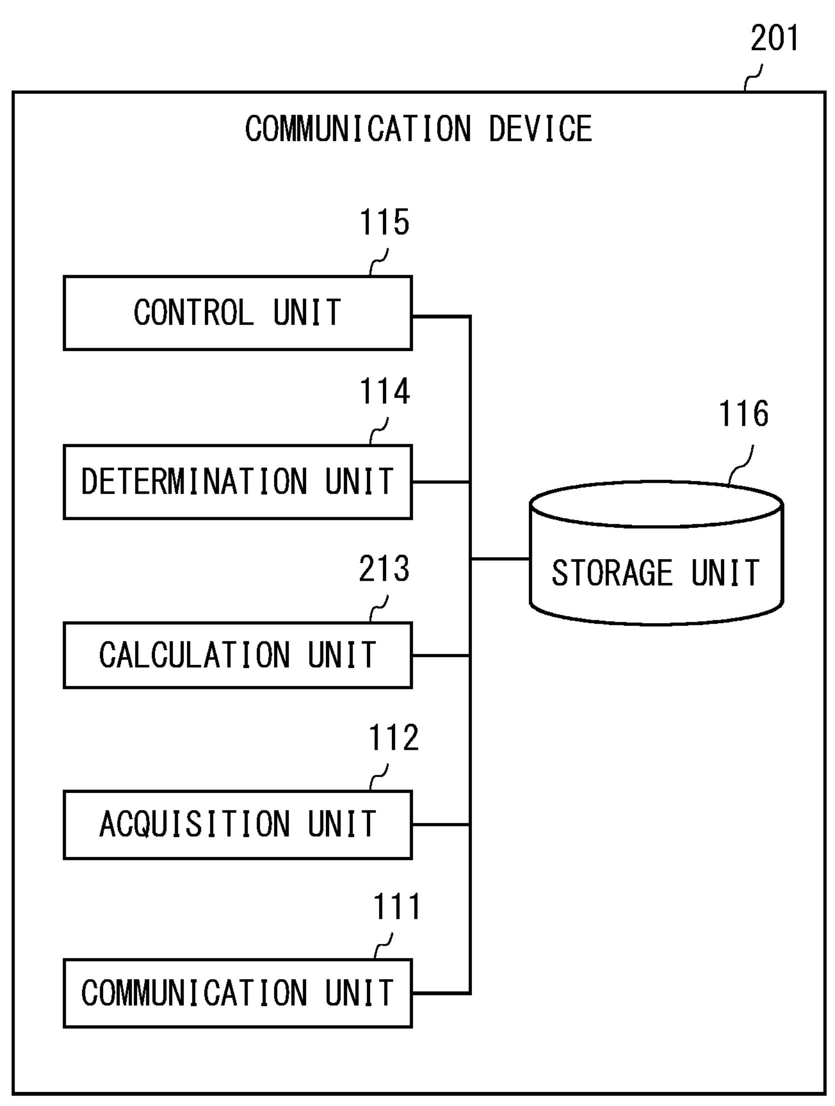
FIG. 11 is a diagram illustrating an example of a configuration of a communication device according to a third example embodiment.

The example of the configuration of the communication device 201 according to the third example embodiment will be described with reference to FIG. 11. FIG. 11 is a diagram illustrating the example of the configuration of the communication device according to the third example embodiment.

The communication device 201 includes a communication unit 111, an acquisition unit 112, a calculation unit 213, a determination unit 114, a control unit 115, and a storage unit 116. In the configuration of the communication device 201, the calculation unit 113 of the communication device 101 according to the second example embodiment is replaced with the calculation unit 213. The configurations of the communication unit 111, the acquisition unit 112, the determination unit 114, the control unit 115, and the storage unit 116 are similar to those in the second example embodiment, and thus, the description thereof will be omitted as appropriate.

The calculation unit 213 performs frequency analysis on acquired measurement values, and determines a length of a first time section based on an analysis result of the frequency analysis. The calculation unit 213 acquires the acquired measurement values from the storage unit 116, executes discrete Fourier transform on the acquired measurement values, and specifies cycles of waveforms constituting the acquired measurement values from calculated frequency components. In a case where the plurality of acquired measurement values is constituted by waveforms that fluctuate in a plurality of cycles according to the analysis result of the frequency analysis, the calculation unit 213 selects one of the plurality of cycles and determines a length of a first time section based on the selected cycle.

In a case where the plurality of acquired measurement values is constituted by waveforms that fluctuate in a plurality of cycles, it is assumed that the smallest cycle among the plurality of cycles is stationary noise that is difficult to remove in current optical communication. Therefore, in a case where the plurality of acquired measurement values is constituted by waveforms that fluctuate in a plurality of cycles, the calculation unit 213 selects the second-smallest cycle and determines a length of the first time section based on the selected cycle. By selecting the second-smallest cycle, the calculation unit 213 reduces fluctuations in cycles greater than or equal to the selected cycle, which are assumed as an influence of noise generated in the communication device or the like. In other words, the calculation unit 213 selects the second-smallest cycle in order to reduce the influence of noise generated in the communication device or the like. Note that the calculation unit 213 may select one of the third-smallest and subsequent cycles from among the plurality of specified cycles.

The calculation unit 213 determines a first time section in consideration of a sampling cycle in which a waveform with the selected cycle can be sampled. For example, the calculation unit 213 may determine ¼ of the selected cycle as the first time section. If the first time section can be divided into shorter sections, the margin value M can become smaller because the obtained variance becomes smaller. However, if the first time section is set to be too short, there is a risk that the followable control speed may be limited. Therefore, this may be considered at the time of determining a first time section.

It is assumed, for example, that the acquisition unit 112 measures Q values in 1-second cycles. It is assumed that the calculation unit 213 executes discrete Fourier transform on waveforms based on the acquired measurement values, and detects that the acquired measurement values are constituted by the waveforms that respectively fluctuate, for example, in 2-second, 13-second, and 35-second cycles. The calculation unit 213 determines that it is difficult to remove a waveform that fluctuates in a 2-second cycle, which is a waveform with the smallest cycle among the detected ones, by a control. The calculation unit 213 select the 13-second cycle, which is the second-shortest cycle, among the 13-second and 35-second cycles in which waveforms fluctuate, and determines a control for following fluctuations in the selected cycle as the purpose. For example, the calculation unit 213 determines 3.25 seconds that is ¼ of 13 seconds of the selected cycle as the first time section. Note that the calculation unit 213 may round up or down decimal places to set the first time section to 3 seconds.

With respect to the measurement values stored in the storage unit 116, the calculation unit 213 calculates an average value and a variance for each first time section based on the measurement values for each first time section according to the determined length. That is, the calculation unit 213 adjusts the length of the first time section, and determines a variance based on the measurement values in the first time section having the adjusted length as the variance in the first time section.

Based on the average value and the variance for each first time section, the calculation unit 213 estimates a cumulative distribution function for Q values based on the measurement values for each first time section. The calculation unit 213 estimates a cumulative distribution function by performing fitting to the Gaussian distribution based on the average value and the variance for each first time section. The calculation unit 213 estimates a cumulative distribution function for the Q values by performing fitting to the Gaussian distribution, with the average value for each first time section being a Q value at which a cumulative probability becomes 0.5 and the variance being a variance of the Gaussian distribution.

Using the cumulative distribution function for the Q values based on the average value and the variance for each first time section, the calculation unit 213 calculates a margin value $M_i$ by obtaining a difference between an average value $a_i$ for each first time section and a Q value at which the cumulative probability becomes a predetermined value ETT in the cumulative distribution function. After calculating margin values $M_i$ for all the first time sections, the calculation unit 213 determines (or calculates) an average value of the margin values $M_i$ as a final margin value M.

After determining the margin value M, the calculation unit 213 calculates an average value and a variance for each first time section based on acquired measurement values, and updates the margin value M based on the average value and the variance for each first time section. In addition, the calculation unit 213 determines a reference quality value using the margin value M. For example, when measurement values are acquired in a first time section after the margin value M is determined, the calculation unit 213 calculates an average value based on the measurement values in the first time section. The calculation unit 213 determines a value obtained by subtracting the margin value M from the calculated average value as the reference quality value.

<Example of Operation of Communication Device>

Figure 12:
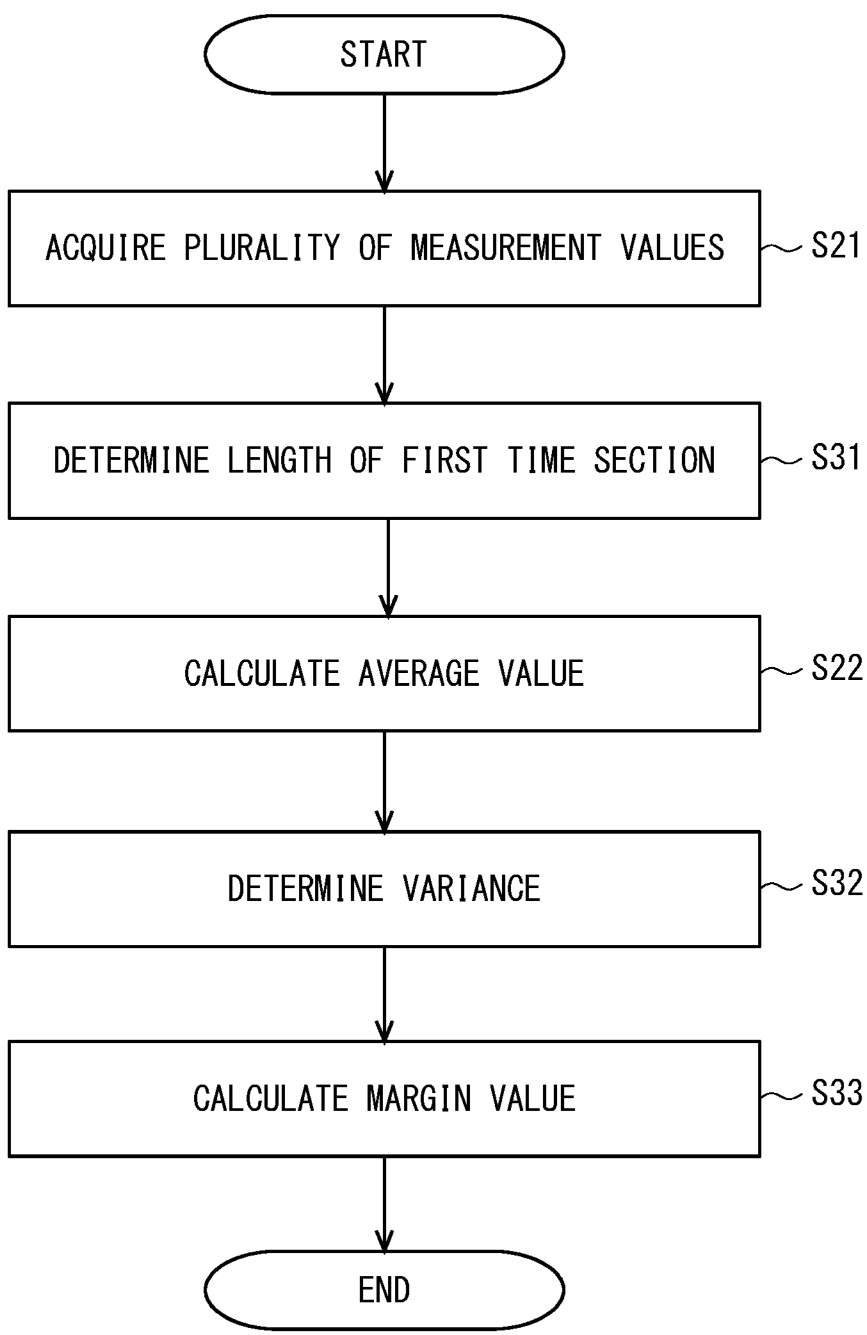
FIG. 12 is a flowchart illustrating an example of an operation of the communication device according to the third example embodiment.

Next, an example of an operation of the communication device 201 according to the third example embodiment will be described with reference to FIG. 12. FIG. 12 is a flowchart illustrating the example of the operation of the communication device according to the third example embodiment. FIG. 12 is a flowchart illustrating a detailed operation of SIT in FIG. 9, which has been described in the second example embodiment. In S11 of FIG. 9, the communication device 201 executes the operation illustrated in FIG. 12. Note that, in the third example embodiment as well, the communication devices 201 and 102 execute the flowchart illustrated in FIG. 9. In the operation illustrated in FIG. 12, the same operation as that in FIG. 10 is denoted by the same reference sign, and the description common to FIG. 10 will be omitted as appropriate.

The acquisition unit 112 acquires a plurality of measurement values related to Q values in an optical communication network N1 (step S21).

The calculation unit 213 performs frequency analysis on the measurement values acquired by the acquisition unit 112, and determines a length of the first time section based on an analysis result of the frequency analysis (step S31). The calculation unit 213 acquires the acquired measurement values from the storage unit 116, executes discrete Fourier transform on the measurement values, and specifies cycles of waveforms constituting the acquired measurement values. In a case where the plurality of acquired measurement values is constituted by waveforms that fluctuate in a plurality of cycles, the calculation unit 213 selects the second-smallest cycle. The calculation unit 213 determines a first time section in consideration of a sampling cycle in which the waveform of the selected cycle can be sampled.

With respect to the measurement values stored in the storage unit 116, based on measurement values for each determined first time section, the calculation unit 213 calculates an average value for each first time section (step S22), and calculates a variance for each first time section (step S32). The calculation unit 213 calculates a variance based on measurement values in a first time section having an adjusted length, and determines the calculated variance as a variance in the first time section.

The calculation unit 213 calculates a margin value M (step S33). Based on the average value and the variance for each first time section, the calculation unit 213 estimates a cumulative distribution function for Q values based on the measurement values for each first time section. Based on the average value and the variance for each first time section, the calculation unit 213 calculates a margin value $M_i$ by obtaining a difference between an average value $a_i$ for each first time section and a Q value at which a cumulative probability becomes a predetermined value ETT in the cumulative distribution function. After calculating margin values $M_i$ for all the first time sections, the calculation unit 213 determines (or calculates) an average value of the margin values $M_i$ as a final margin value M.

As described above, similarly to the calculation unit 113 according to the second example embodiment, the calculation unit 213 can determine a reference quality value using the margin value M. Therefore, similarly to the second example embodiment, the communication device 201 according to the third example embodiment can easily and immediately determine communication quality in an optical communication network, and enables a communication carrier to grasp the communication quality in the optical communication network.

In addition, by performing frequency analysis on the acquired measurement values, the calculation unit 213 determines a length of a first time section, and determines a reference quality value using an average value and a variance based on measurement values in the first time section according to the determined length. That is, unlike the second example embodiment, the calculation unit 213 can determine a margin value M using the average value and the variance based on all the measurement values. As a result, the communication device 201 according to the third example embodiment can determine a margin value M more accurately than that in the second example embodiment. Therefore, the communication device 201 according to the third example embodiment enables the communication carrier more accurately and appropriately grasp communication quality in the optical communication network than that in the second example embodiment.

Fourth Example Embodiment

Next, a fourth example embodiment will be described. The fourth example embodiment is an improved example of the second example embodiment and the third example embodiment. The fourth example embodiment will be described using the second example embodiment.

<Example of Configuration of Communication Device>

Figure 13:
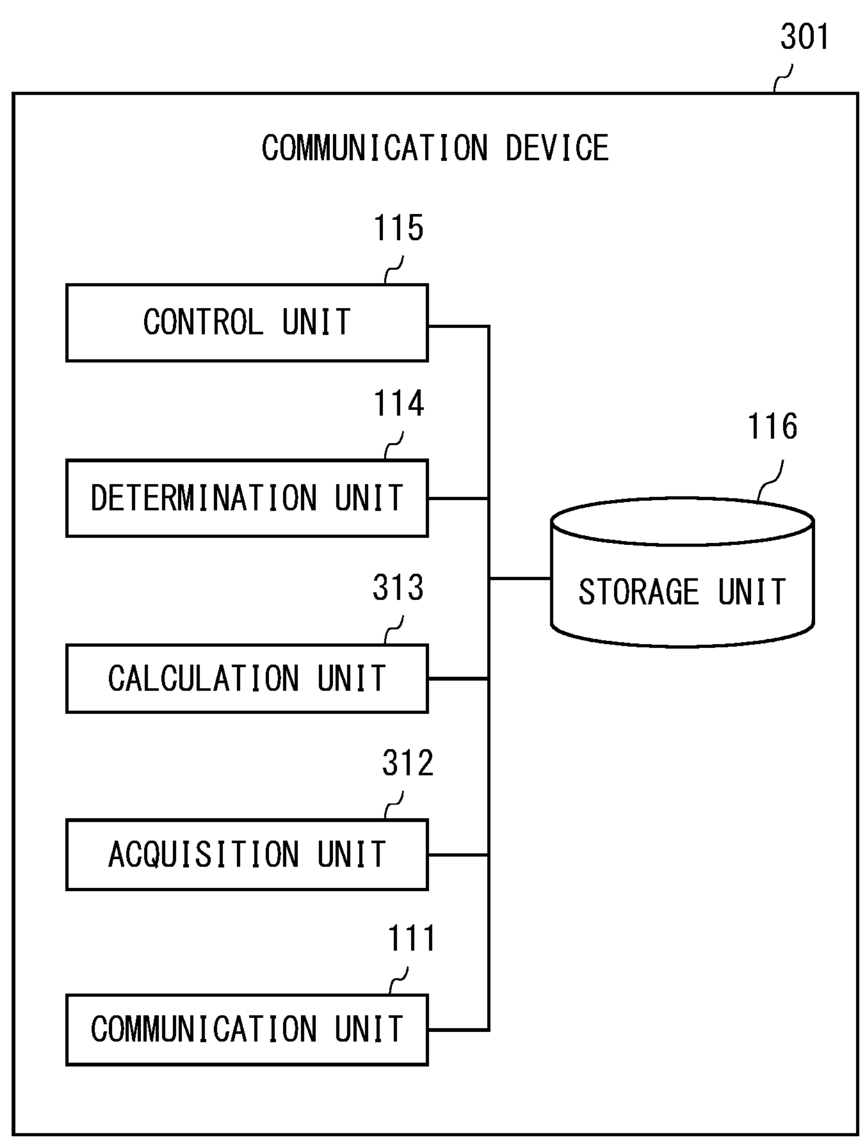
FIG. 13 is a diagram illustrating an example of a configuration of a communication device according to a fourth example embodiment.

An example of a configuration of a communication device 301 according to the fourth example embodiment will be described with reference to FIG. 13. FIG. 13 is a diagram illustrating the example of the configuration of the communication device according to the fourth example embodiment. The communication device 301 includes a communication unit 111, an acquisition unit 312, a calculation unit 313, a determination unit 114, a control unit 115, and a storage unit 116. In the configuration of the communication device 301, the acquisition unit 112 of the communication device 101 according to the second example embodiment is replaced with the acquisition unit 312, and the calculation unit 113 is replaced with the calculation unit 313. The configurations of the communication unit 111, the acquisition unit 112, the determination unit 114, the control unit 115, and the storage unit 116 are similar to those in the second example embodiment, and thus, the description thereof will be omitted as appropriate. Note that, in the configuration of the optical communication system according to the fourth example embodiment, the communication device 101 in the second example embodiment is merely replaced with the communication device 301. Therefore, the description of the configuration of the optical communication system according to the fourth example embodiment will be omitted. Furthermore, in the following description, the example of the configuration of the communication device 301 will be described while appropriately omitting the content common to the second example embodiment.

The acquisition unit 312 acquires a plurality of measurement values related to Q values, which are communication quality information, in an optical communication network N1. Based on a communication setting in the optical communication network N1, the acquisition unit 312 specifies a first group corresponding to the communication setting in the optical communication network N1 among at least one first group based on a setting value of the communication setting. The first group is a group prepared in advance based on a setting value that can be taken for the communication setting in the optical communication network N1. In other words, the first group is a group prepared in advance based on a candidate setting value for the communication setting in the optical communication network N1. The acquisition unit 312 classifies the plurality of acquired measurement values into the specified first group. That is, the acquisition unit 312 classifies the plurality of acquired measurement values into the first group corresponding to the communication setting in the optical communication network N1.

The acquisition unit 312 acquires communication setting information related to a communication setting in the optical communication network N1 from, for example, the communication device 102 or a network monitoring device (not illustrated) that monitors and controls the optical communication network N1. Based on the communication setting information, the acquisition unit 312 specifies a first group corresponding to the communication setting in the optical communication network N1 among at least one first group, and classifies the plurality of acquired measurement values into the specified first group.

Examples of the communication setting include a quadrature amplitude modulation (QAM) setting and a probabilistic constellation shaping (PCS) setting, for example. The QAM setting and the PCS setting are settings related to a modulation of a communication signal in the optical communication network N1.

For example, it is assumed that a Q-value variance in 16QAM becomes larger than a Q-value variance in QPSK. In this way, it is assumed that the Q-value variance is changed by changing the order of QAM. In other words, it is assumed that the Q-value variance is changed by changing a distance between modulation symbols.

In addition, the PCS setting is used together with the QAM setting, and is a setting related to processing of reducing a frequency of using symbols located on the outer side far from the center and increasing a frequency of using symbols located on the inner side close to the center in a constellation corresponding to QAM. In the constellation, when symbols located at positions far from the center are used, an error rate increases. Therefore, by changing the PCS setting to reduce a probability that the symbols located at positions far from the center appear, it is assumed that the communication speed is reduced, but the error rate decreases and the Q-value variance becomes smaller. In addition, by performing the PCS setting to increase the probability that the symbols located at positions far from the center appear, it is assumed that the communication speed is increased, but the error rate also increases, and thus, the Q-value variance becomes larger.

In the present example embodiment, at least one first group is prepared in advance based on the order of QAM as a QAM setting and the probability that the symbols located at positions far from the center on the constellation appear as a PCS setting. In other words, in the present example embodiment, at least one first group based on a value (setting value) of the order of QAM and a value (setting value) of the probability that the symbols located at positions far from the center on the constellation appear is prepared in advance. Then, based on the communication setting information, the acquisition unit 312 specifies a first group corresponding to the communication setting in the optical communication network N1 among at least one first group, and classifies the plurality of acquired measurement values into the specified first group.

Based on the measurement values included in the first group corresponding to the communication setting in the optical communication network N1, the calculation unit 313 calculates an average value for each first time section and determines a variance for each first time section in the same manner as that in the second example embodiment. In other words, based on the measurement values included in the first group specified by the acquisition unit 312, the calculation unit 313 calculates an average value for each first time section and determines a variance for each first time section in the same manner as that in the second example embodiment.

<Example of Operation of Communication Device>

Figure 14:
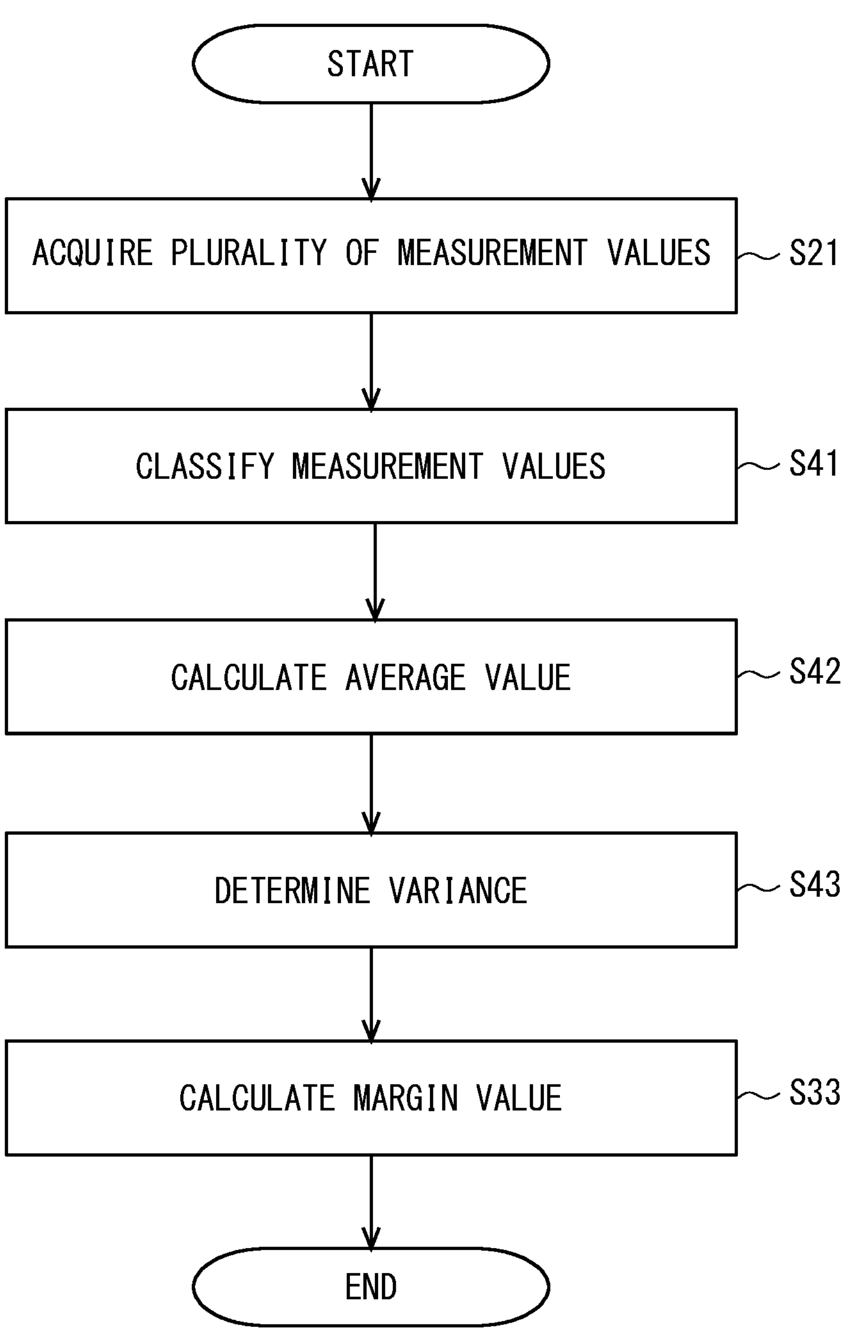
FIG. 14 is a flowchart illustrating an example of an operation of the communication device according to the fourth example embodiment.

Next, an example of an operation of the communication device 301 according to the fourth example embodiment will be described with reference to FIG. 14. FIG. 14 is a flowchart illustrating the example of the operation of the communication device according to the fourth example embodiment.

FIG. 14 is a flowchart illustrating a detailed operation of S11 in FIG. 9 described in the second example embodiment. In S11 of FIG. 9, the communication device 301 executes the operation illustrated in FIG. 14. Note that, in the fourth example embodiment as well, the communication devices 301 and 102 execute the flowchart illustrated in FIG. 9. In the operation illustrated in FIG. 14, the same operation as that in FIG. 10 is denoted by the same reference sign, and the description common to FIG. 10 will be omitted as appropriate.

The acquisition unit 312 acquires a plurality of measurement values related to Q values in the optical communication network N1 (step S21).

Based on the communication setting in the optical communication network N1, the acquisition unit 312 classifies the plurality of measurement values into a first group corresponding to the communication setting in the optical communication network N1 among at least one first group based on a setting value of the communication setting (step S41). The acquisition unit 312 acquires communication setting information related to the communication setting in the optical communication network N1. Based on the communication setting information, the acquisition unit 312 specifies a first group corresponding to the communication setting in the optical communication network N1 among at least one first group. The acquisition unit 312 classifies the plurality of acquired measurement values into the specified first group.

Based on the measurement values included in the first group corresponding to the communication setting in the optical communication network N1, the calculation unit 313 calculates an average value for each first time section (step S42). Based on the measurement values included in the first group specified by the acquisition unit 312, the calculation unit 313 calculates an average value for each first time section in the same manner as that in the second example embodiment.

Based on the measurement values included in the first group corresponding to the communication setting in the optical communication network N1, the calculation unit 313 determines a variance for each first time section (step S43). Based on the measurement values included in the first group specified by the acquisition unit 312, the calculation unit 313 determines a variance for each first time section in the same manner as that in the second example embodiment.

The calculation unit 313 calculates a margin value M (step S33). The calculation unit 313 calculates margin values $M_i$, and determines an average value of the margin values $M_i$ as a margin value M, in the same manner as that in the second example embodiment.

As described above, it is assumed that the variance of the measurement values varies depending on the communication setting in the optical communication network N1. Therefore, based on the communication setting in the optical communication network N1, the acquisition unit 312 classifies the acquired measurement values into a first group corresponding to the communication setting in the optical communication network N1 among first groups based on a setting value of the communication setting. Then, based on the measurement values included in the first group corresponding to the communication setting in the optical communication network N1, the calculation unit 313 obtains an average value and a variance for each first time section, and determines a margin value M. That is, the calculation unit 313 can accurately determine a variance and a margin value M based on the measurement values having similar variances. Therefore, the communication device 301 according to the fourth example embodiment can determine a reference quality value using the margin value M that is more accurate than that in those in the second and third example embodiments. Therefore, the communication device 301 according to the fourth example embodiment enables a communication carrier to grasp communication quality in the optical communication network more accurately than those in the second and third example embodiments.

(Modified Example)

In the fourth example embodiment described above, a second group based on an average value serving as a reference and a variance serving as a reference may further be used so that a margin value M can be accurately calculated. Specifically, at least one second group may be prepared in advance based on a combination of a reference average value indicating an average value that can be calculated by the calculation unit 313 and a reference variance value indicating a variance that can be determined by the calculation unit 313. Based on the calculated average value and the determined variance, the calculation unit 313 may specify a second group including a reference average value similar to the calculated average value and a reference variance value similar to the determined variance among the at least one second group. The calculation unit 313 classifies the calculated average value and the determined variance into the specified second group. The calculation unit 313 may calculate a margin value M using the classified average value and variance included in the second group, and calculate a reference quality value based on the calculated average value and margin value M.

As in the present modified example, by using not only the first group but also the second group, it is possible to not only determine a variance based on the measurement values assumed to have similar variances, but also accurately determine a margin value M using similar average values and similar variances. Therefore, by modifying the fourth example embodiment as in the present modified example, it is possible to determine a margin value M and a reference quality value more accurately than those in the fourth example embodiment.

Fifth Example Embodiment

Next, a fifth example embodiment will be described. The fifth example embodiment is an improved example of the second to fourth example embodiments, and is different from the second to fourth example embodiments in the control content executed by the control unit. The fifth example embodiment will be described using the second example embodiment.

<Example of Configuration of Communication Device>

Figure 15:
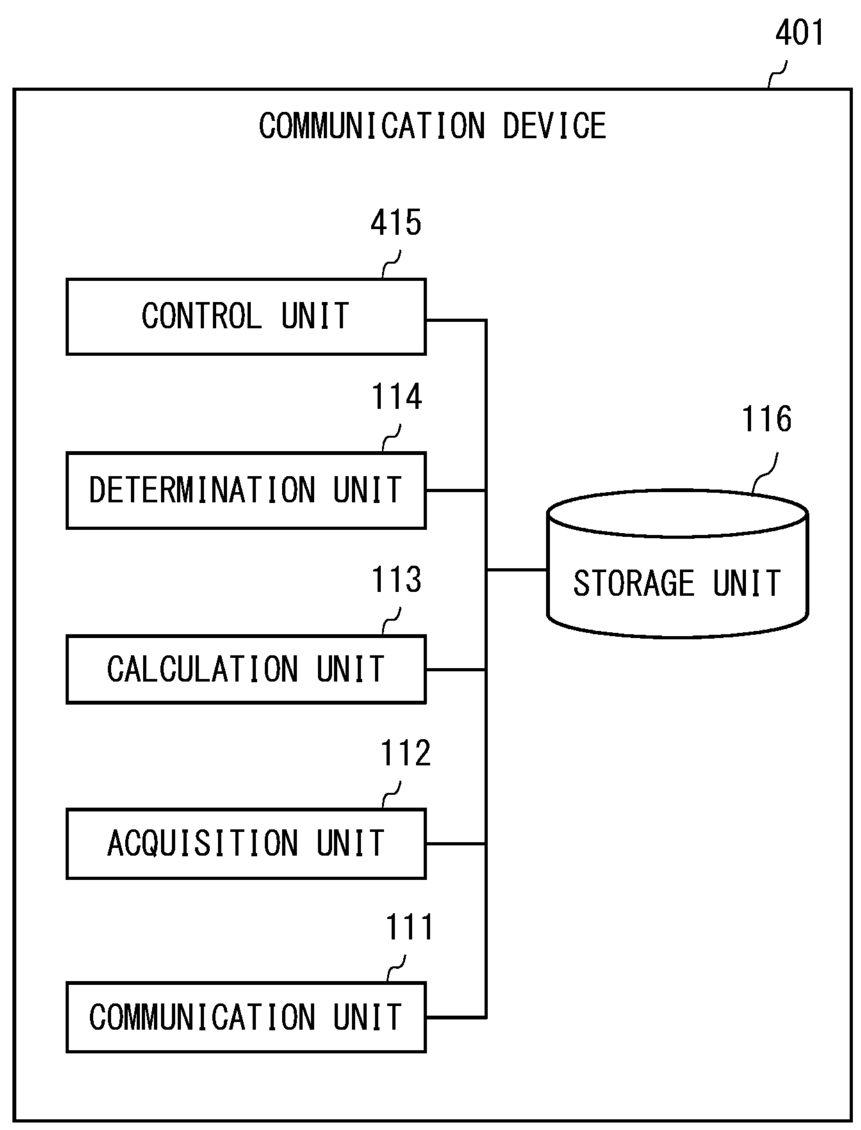
FIG. 15 is a diagram illustrating an example of a configuration of a communication device according to a fifth example embodiment.

An example of a configuration of a communication device 401 according to the fifth example embodiment will be described with reference to FIG. 15. FIG. 15 is a diagram illustrating the example of the configuration of the communication device according to the fifth example embodiment. The communication device 401 includes a communication unit 111, an acquisition unit 112, a calculation unit 113, a determination unit 114, a control unit 415, and a storage unit 116. In the configuration of the communication device 401, the control unit 115 of the communication device 101 according to the second example embodiment is replaced with the control unit 415. The configurations of the communication unit 111, the acquisition unit 112, the calculation unit 113, the determination unit 114, and the storage unit 116 are similar to those in the second example embodiment, and thus, the description thereof will be omitted as appropriate.

Note that, in the configuration of the optical communication system according to the fifth example embodiment, the communication device 101 in the second example embodiment is merely replaced with the communication device 401. Therefore, the description of the configuration of the optical communication system according to the fifth example embodiment will be omitted. Furthermore, in the following description, the example of the configuration of the communication device 401 will be described while appropriately omitting the content common to the second example embodiment.

Based on a determination result of the determination unit 114, the control unit 415 changes a communication setting in an optical communication network N1 so that communication quality satisfies a required quality value. When determining the control content, the control unit 415 transmits the control content to a communication device 102 via the communication unit 111, and changes the communication setting in the optical communication network N1 via the communication device 102.

The control unit 415 acquires the acquired measurement values from the storage unit 116, and performs frequency analysis by executing discrete Fourier transform on the acquired measurement values. The control unit 415 specifies cycles of waveforms constituting the acquired measurement values from frequency components calculated by the discrete Fourier transform. Note that, when the calculation unit 113 performs frequency analysis as in the third example embodiment, the control unit 415 may use an analysis result of the performed frequency analysis.

Through the frequency analysis, the control unit 415 determines whether the plurality of measurement values is constituted by a waveform that fluctuates in a cycle larger than a predetermined cycle. The predetermined cycle may be, for example, a cycle considered to be stationary noise. Alternatively, the predetermined cycle may be a first stabilization time to be described later, may be a time obtained by multiplying the first stabilization time by a predetermined coefficient, or may be a time determined based on the first stabilization time.

When the plurality of measurement values is constituted by a waveform that fluctuates in a cycle larger than the predetermined cycle, the control unit 415 executes at least one of a first control or a second control based on the cycles corresponding to the waveforms. The first control is a control in which a stabilization time from execution of the control to stabilization of the communication quality is a first stabilization time, and the second control is a control in which a stabilization time is a second stabilization time longer than the first stabilization time. The first stabilization time and the second stabilization time may be determined in consideration of a control cycle indicating a cycle at which the control can be executed. Each of the first stabilization time and the second stabilization time may be determined as a time of several times the control cycle. When the control cycle of the second control is, for example, 4 seconds, the second stabilization time may be determined as 16 seconds that is, for example, 4 times the control cycle of the second control.

When the plurality of measurement values is constituted by a waveform that fluctuates in a cycle larger than the predetermined cycle and the cycle corresponding to the waveform is longer than the second stabilization time, the control unit 415 executes the second control. When the plurality of measurement values is constituted by a waveform that fluctuates in a cycle larger than the predetermined cycle and the cycle corresponding to the waveform is shorter than the second stabilization time, the control unit 415 executes the first control.

For example, when the plurality of measurement values is constituted by waveforms that fluctuate in 2-second, 13-second, and 35-second cycles and the predetermined cycle is 2 seconds, the control unit 415 determines that the plurality of measurement values is constituted by the waveforms that fluctuate in the 13-second and 35-second cycles. When the first stabilization time is, for example, 8 seconds and the second stabilization time is, for example, 16 seconds, the control unit 415 executes a control so that a reference quality value satisfies a required quality value by executing the second control on the waveform that fluctuates in the 35-second cycle. In addition, the control unit 415 executes a control so that the reference quality value satisfies the required quality value by executing the first control on the waveform that fluctuates in the 13-second cycle.

The first control may include, for example, a control for changing at least one of a QAM setting or a PCS setting. The QAM setting and the PCS setting can be changed in about several seconds. Therefore, when the plurality of measurement values is constituted by a waveform that fluctuates in a cycle larger than the predetermined cycle and the cycle corresponding to the waveform is shorter than the second stabilization time, the control unit 415 changes at least one of the QAM setting or the PCS setting as the first control.

When the reference quality value exceeds the required quality value, the control unit 415 executes a control to increase a communication speed of a communication signal transmitted in the optical communication network N1. The control unit 415 changes the QAM setting to increase the order of QAM. The control unit 415 changes the PCS setting to increase a probability that symbols located at positions far from the center on a constellation appear.

When the reference quality value does not exceed the required quality value, the control unit 415 executes a control to reduce the communication speed of the communication signal transmitted in the optical communication network N1. The control unit 415 changes the QAM setting to decrease the order of QAM. The control unit 415 changes the PCS setting to decrease the probability that symbols located at positions far from the center on the constellation appear.

The second control may include a control for changing at least one of a frequency of the communication signal, an amplification power, or an optical switch setting in the optical communication network N1. The change in the frequency of the communication signal, the amplification power, and an optical path setting in the optical communication network N1 may require a change in a plurality of communication devices, and thus, such a setting change may take a longer time than the change in the QAM setting and the PCS setting. Therefore, when the plurality of measurement values is constituted by a waveform that fluctuates in a cycle larger than the predetermined cycle and the cycle corresponding to the waveform is longer than the second stabilization time, the control unit 415 executes the second control. That is, the control unit 415 changes at least one of the frequency of the communication signal, the amplification power, or the optical path setting in the optical communication network N1 as the second control.

When the reference quality value exceeds the required quality value, the control unit 415 changes the frequency of the communication signal to become close to a frequency of an adjacent channel. When the frequency of the communication signal is changed to a frequency close to the frequency of the adjacent channel, an error rate increases, but the communication speed can be increased because the communication signal is densified, and the communication capacity per communication line is increased.

When the reference quality value exceeds the required quality value, the control unit 415 changes the amplification power by a repeater (optical packet switches 105 and 106) in the optical communication network N1 to decrease the amplification power of an optical path. In long-distance communication, a power supply amount may be limited, and the amplification power of the optical path should be saved within a range in which communication quality can be ensured. When the amplification power by the repeater is reduced, the error rate at a signal reception end increases, but power saving can be achieved.

When the reference quality value exceeds the required quality value, the control unit 415 changes the optical switch setting to shorten an optical path changing cycle. In the optical switch, for example, by shortening a time for changing the optical path setting, the error rate increases because fluctuations in quality increase in cycles shorter than the time for changing the communication setting, but large-capacity communication can be performed because the efficiency in accommodating communication signals is increased. Note that, when the reference quality value exceeds the required quality value, the control unit 415 may change the optical switch setting to shorten a frame length of the optical packet switch.

When the reference quality value does not exceed the required quality value, the control unit 415 changes the frequency of the communication signal to be far from the frequency of the adjacent channel. When the reference quality value does not exceed the required quality value, the control unit 415 changes the amplification power by the repeater (the optical packet switches 105 and 106) in the optical communication network N1 to increase the amplification power of the optical path. When the reference quality value does not exceed the required quality value, the control unit 415 changes the optical switch setting to lengthen the optical path changing cycle. Note that, when the reference quality value does not exceed the required quality value, the control unit 415 may change the optical switch setting to lengthen the frame length of the optical packet switch.

<Example of Operation of Communication Device>

Figure 16:
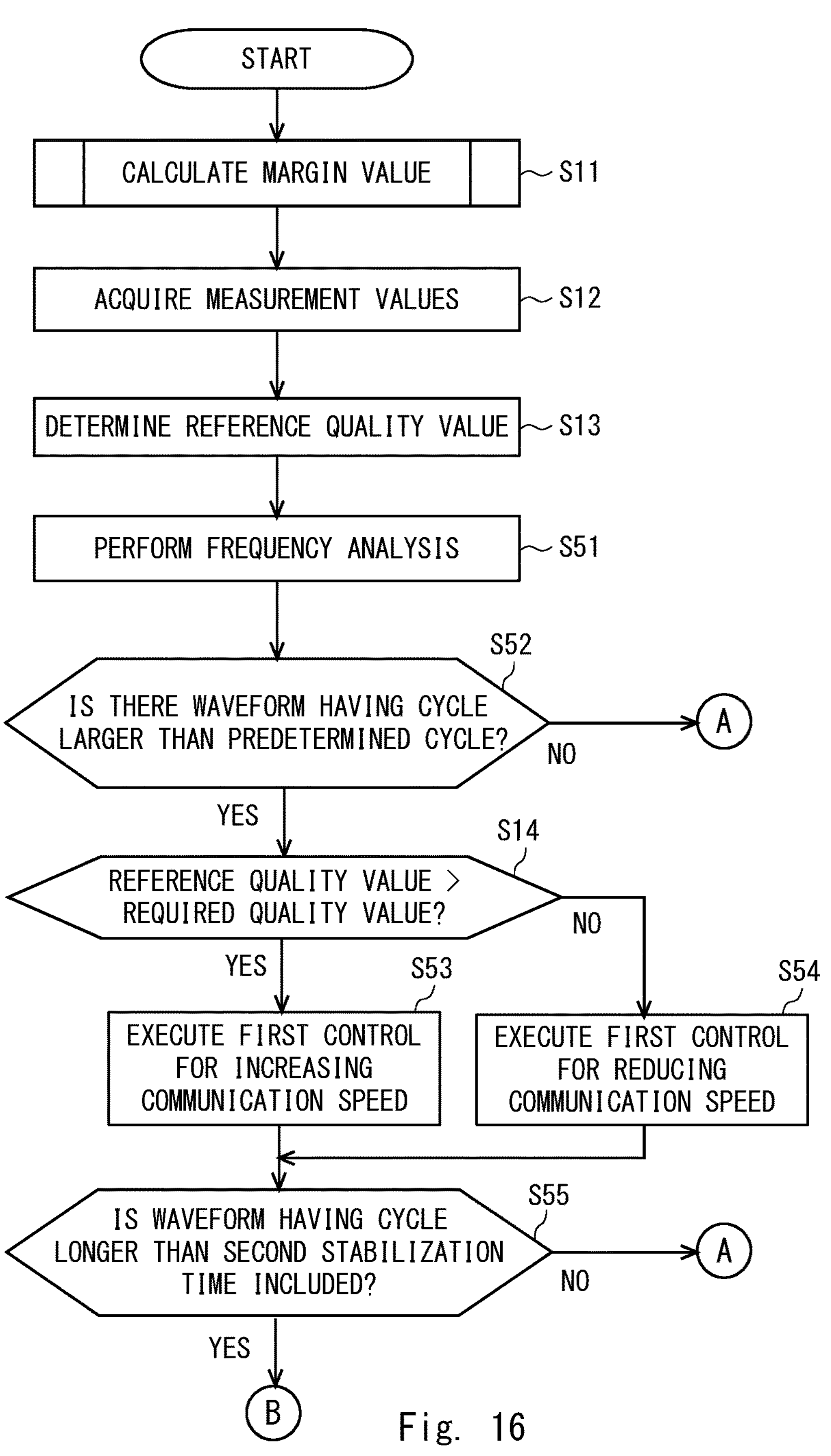
FIG. 16 is a flowchart illustrating an example of an operation of the communication device according to the fifth example embodiment.
Figure 17:
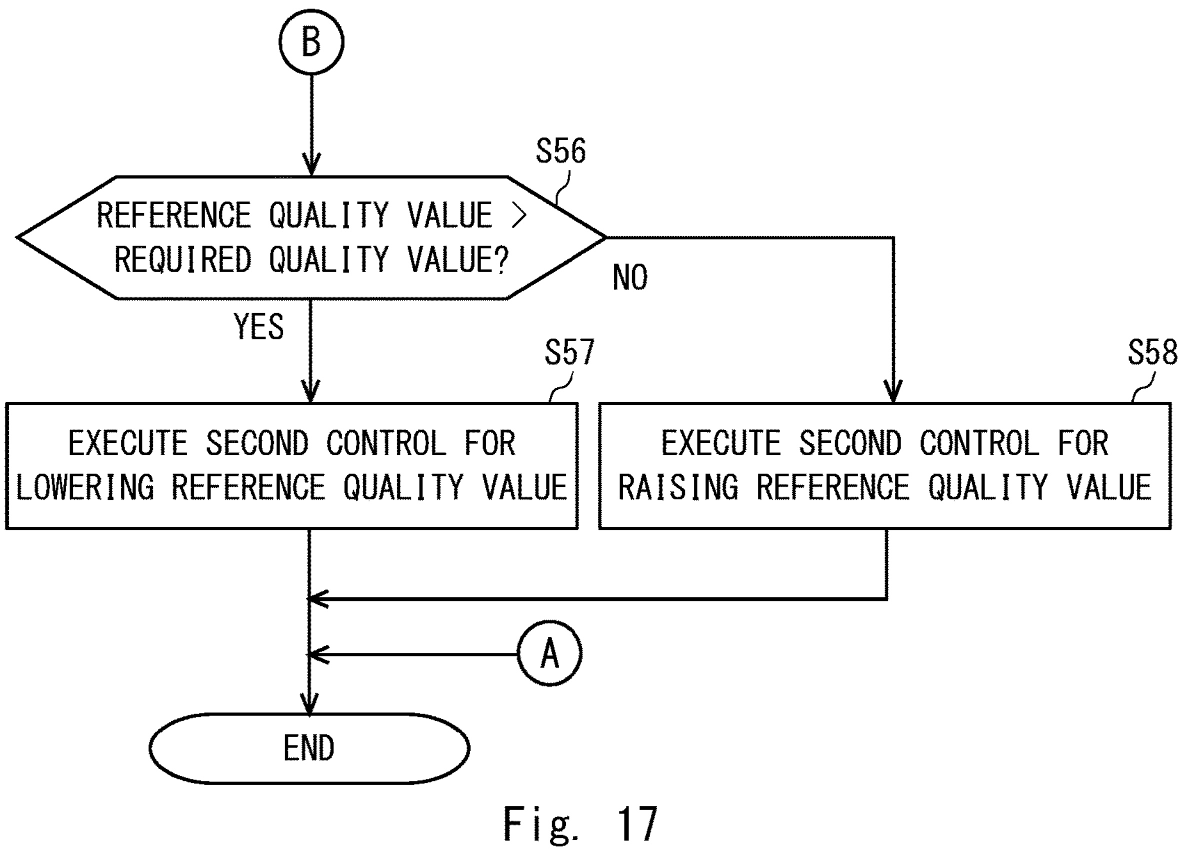
FIG. 17 is a flowchart illustrating an example of an operation of the communication device according to the fifth example embodiment.

Next, an example of an operation of the communication device 401 according to the fifth example embodiment will be described with reference to FIGS. 16 and 17. FIGS. 16 and 17 are a flowchart illustrating the example of the operation of the communication device according to the fifth example embodiment. FIGS. 16 and 17 correspond to the flowchart of FIG. 9 described in the second example embodiment. In the present example embodiment, the communication devices 401 and 102 execute the flowchart illustrated in FIGS. 16 and 17. Note that, in FIGS. 16 and 17, the same operation as that illustrated in FIG. 9 is denoted by the same reference sign, and the description of the operation common to that in the second example embodiment will be omitted as appropriate.

The communication device 401 calculates a margin value (step S11). Note that, in step S11, the communication device 401 executes the operation described with reference to FIG. 10.

The acquisition unit 112 acquires measurement values (step S12), and the calculation unit 113 determines a reference quality value (step S13).

The control unit 415 performs frequency analysis on the plurality of acquired measurement values (step S51). The control unit 415 executes discrete Fourier transform on the acquired measurement values, and specifies cycles of waveforms constituting the acquired measurement values from calculated frequency components.

The control unit 415 determines whether there is a waveform having a cycle larger than a predetermined cycle (step S52). The control unit 415 determines whether the plurality of measurement values is constituted by a waveform that fluctuates in a cycle larger than the predetermined cycle.

When there is a waveform having a cycle larger than the predetermined cycle (YES in step S52), the determination unit 114 executes step S14. In other words, when the plurality of measurement values is constituted by a waveform that fluctuates in a cycle larger than the predetermined cycle, the determination unit 114 executes step S14.

On the other hand, when there is no waveform having a cycle larger than the predetermined cycle (NO in step S52), the communication device 401 ends the processing. In other words, when the plurality of measurement values is constituted by a waveform that fluctuates in a cycle larger than the predetermined cycle, the communication device 401 ends the processing.

In step S14, the determination unit 114 determines whether the reference quality value is larger than the required quality value (step S14).

When the reference quality value is larger than the required quality value (YES in step S14), the control unit 415 executes step S53.

When the reference quality value is not larger than the required quality value (NO in step S14), the control unit 415 executes step S54.

In step S53, the control unit 415 executes a first control for increasing a communication speed of a communication signal transmitted in the optical communication network N1 (step S53). The control unit 415 changes a QAM setting to increase the order of QAM. The control unit 415 changes a PCS setting to increase a probability that symbols located at positions far from the center on a constellation appear. When determining the control content for changing at least one of the QAM setting or the PCS setting as described above, the control unit 415 transmits the control content to the communication device 102 via the communication unit 111. A control unit 122 changes a communication setting in the optical communication network N1 by changing at least one of the QAM setting or the PCS setting based on the control content received from the communication device 101.

In step S54, the control unit 415 executes a first control for reducing the communication speed of the communication signal transmitted in the optical communication network N1 (step S54). The control unit 415 changes the QAM setting to decrease the order of QAM. The control unit 415 changes the PCS setting to decrease the probability that symbols located at positions far from the center on the constellation appear. When determining the control content for changing at least one of the QAM setting or the PCS setting as described above, the control unit 415 transmits the control content to the communication device 102 via the communication unit 111. The control unit 122 changes the communication setting in the optical communication network N1 by changing at least one of the QAM setting or the PCS setting based on the control content received from the communication device 101.

In step S55, the control unit 415 determines whether a waveform having a cycle longer than a second stabilization time is included (step S55). When the plurality of measurement values is constituted by a waveform that fluctuates in a cycle larger than the predetermined cycle, the control unit 415 determines whether the cycle corresponding to the waveform is longer than the second stabilization time.

When a waveform having a cycle longer than the second stabilization time is included (YES in step S55), the determination unit 114 executes step S56.

When no waveform having a cycle longer than the second stabilization time is included (NO in step S55), the communication device 401 ends the processing.

In step S56, the determination unit 114 determines whether the reference quality value is larger than the required quality value (step S56). Similarly to step S14, by determining whether the reference quality value is larger than the required quality value, the determination unit 114 determines whether communication quality in the optical communication network N1 satisfies the required quality value.

When the reference quality value is larger than the required quality value (YES in step S56), the control unit 415 executes step S57.

When the reference quality value is not larger than the required quality value (NO in step S56), the control unit 415 executes step S58.

In step S57, the control unit 415 executes a second control for lowering the reference quality value (step S57). The control unit 415 changes the frequency of the communication signal to become close to a frequency of an adjacent channel. The control unit 415 changes an amplification power by a repeater (the optical packet switches 105 and 106) in the optical communication network N1 to decrease the amplification power of the optical path. The control unit 415 changes an optical switch setting to shorten an optical path changing cycle. When determining the control content for changing at least one of the frequency of the communication signal, the amplification power, or the optical switch setting in the optical communication network N1 as described above, the control unit 415 transmits the control content to the communication device 102 via the communication unit 111. By changing at least one of the frequency of the communication signal, the amplification power, or the optical switch setting in the optical communication network N1 based on the control content received from the communication device 101, the control unit 122 changes the communication setting in the optical communication network N1.

In step S58, the control unit 415 executes a second control for raising the reference quality value (step S58). The control unit 415 changes the frequency of the communication signal to be far from a frequency of an adjacent channel. The control unit 415 changes the amplification power by the repeater (the optical packet switches 105 and 106) in the optical communication network N1 to increase the amplification power of the optical path. The control unit 415 changes the optical switch setting to lengthen the optical path changing cycle. When determining the control content for changing at least one of the frequency of the communication signal, the amplification power, or the optical switch setting in the optical communication network N1 as described above, the control unit 415 transmits the control content to the communication device 102 via the communication unit 111. By changing at least one of the frequency of the communication signal, the amplification power, or the optical switch setting in the optical communication network N1 based on the control content received from the communication device 101, the control unit 122 changes the communication setting in the optical communication network N1.

After executing step S57 or step S58, the communication device 401 ends the processing. The communication device 102 also ends the processing. Note that, although FIGS. 16 and 17 are a flowchart in which the processing ends after step S57 or S58 is executed, the communication devices 401 and 102 may return to step S12 and continue the processing after the execution of step S57 or S58 is completed. Alternatively, when the execution of step S57 or S58 is completed, the communication devices 401 and 102 may execute the flowchart illustrated in FIGS. 16 and 17 again.

By executing the control for changing at least one of the first control or the second control based on the cycles of the waveforms constituting the plurality of measurement values, the communication device 401 enables an optimal control for each of the waveforms constituting the plurality of measurement values. As described above, by combining the first control with the second control, the communication device 401 according to the fifth example embodiment can efficiently select an optimal control for improving the communication quality in the optical communication network. Therefore, the communication device 401 according to the fifth example embodiment is capable of executing controls corresponding to more diverse and complicated communication environments, and this makes it possible for the communication carrier to optimize the communication quality of the optical communication network.

Other Example Embodiments

Figure 18:
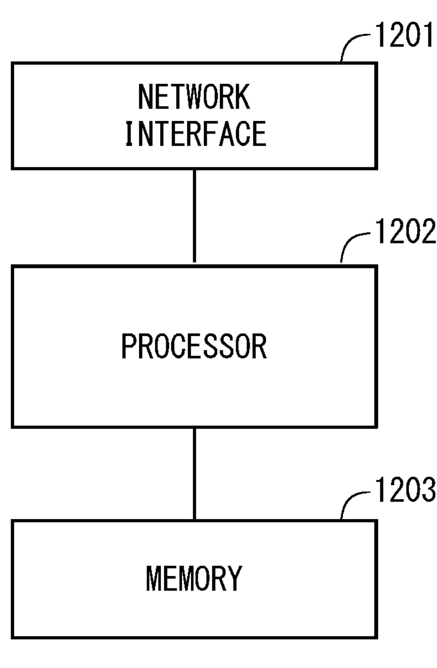
FIG. 18 is a diagram illustrating a hardware configuration example of a communication device.

FIG. 18 is a block diagram illustrating a hardware configuration example of the communication devices 1, 101, 102, 201, 301, and 401 (hereinafter, referred to as the "communication device 1 or the like") described in the example embodiments described above. Referring to FIG. 18, the communication device 1 or the like includes a network interface 1201, a processor 1202, and a memory 1203. The network interface 1201 is used to communicate with other communication devices included in an optical communication system.

The processor 1202 executes the processes of the communication device 1 or the like described using the flowcharts in the example embodiments described above, by reading software (computer programs) from the memory 1203 and executing the software. The processor 1202 may be, for example, a microprocessor, a micro processing unit (MPU), or a central processing unit (CPU). The processor 1202 may include a plurality of processors.

The memory 1203 is constituted by a combination of a volatile memory and a nonvolatile memory. The memory 1203 may include a storage disposed away from the processor 1202. In this case, the processor 1202 may access the memory 1203 through an input/output (I/O) interface that is not illustrated.

In the example in FIG. 18, the memory 1203 is used to store a group of software modules. The processor 1202 can execute the processes of the communication device 1 or the like described in the example embodiments described above by reading the group of software modules from the memory 1203 and executing the group of software modules.

As described with reference to FIG. 18, each of the processors included in the communication device 1 or the like executes one or more programs including a group of commends for causing a computer to execute the algorithm described with reference to the drawings.

In the example described above, the program includes a group of commands (or software codes) for causing, when read by the computer, the computer to execute one or more functions described in the example embodiments. The program may be stored in a non-transitory computer-readable medium or a tangible storage medium. As an example and not by way of limitation, the computer-readable medium or the tangible storage medium includes a random-access memory (RAM), a read-only memory (ROM), a flash memory, a solid-state drive (SSD) or another memory technology, a CD-ROM, a digital versatile disc (DVD), a Blu-ray (registered trademark) disc or another optical disc storage, a magnetic cassette, a magnetic tape, a magnetic disk storage or another magnetic storage device. The program may be transmitted on a transitory computer-readable medium or a communication medium. As an example and not by way of limitation, the transitory computer-readable medium or the communication medium includes electrical, optical, acoustic, or other forms of propagated signals.

In addition, the present disclosure is not limited to the example embodiments described above, and can be appropriately modified without departing from the spirit. In addition, the present disclosure may be implemented by appropriately combining the example embodiments.

In addition, some or all of the example embodiments described above can be described as the following supplementary notes, but are not limited to the following supplementary notes.

(Supplementary Note 1)

A communication device including:

acquisition means configured to acquire a plurality of measurement values related to communication quality information in an optical communication network;

calculation means configured to calculate an average value of measurement values for each first time section based on the plurality of measurement values, determine a variance of the measurement values for each first time section, and determine a reference quality value based on the average value and the variance, the reference quality value being an index value indicating communication quality in the optical communication network; and determination means configured to determine whether the communication quality satisfies a required quality value based on the reference quality value.

(Supplementary Note 2)

The communication device according to supplementary note 1, in which the calculation means is configured to estimate a cumulative distribution function for the communication quality information based on the average value and the variance, calculate a margin value indicating a difference between the average value and a value of the communication quality information at which a cumulative probability has a predetermined value in the cumulative distribution function, and determine the reference quality value based on the average value and the margin value.

(Supplementary Note 3)

The communication device according to supplementary note 1 or 2, in which the calculation means is configured to determine a set indicating times for determining the variance based on the average value, and determine the variance based on measurement values included in the set.

(Supplementary Note 4)

The communication device according to supplementary note 3, in which when a difference between an average value in a second time section among a plurality of first time sections and an average value in a third time section immediately before the second time section is smaller than or equal to a predetermined threshold value, the calculation means is configured to determine the set so that the second time section is included in the set of first time sections.

(Supplementary Note 5)

The communication device according to supplementary note 1 or 2, in which the calculation means is configured to perform frequency analysis on the plurality of measurement values, determine a length of the first time section based on an analysis result of the frequency analysis, and determine the variance based on measurement values for each first time section according to the determined length.

(Supplementary Note 6)

The communication device according to supplementary note 5, in which, on a basis of the analysis result of the frequency analysis, in a case where the plurality of measurement values is constituted by waveforms that fluctuate in a plurality of cycles, the calculation means is configured to select one of the plurality of cycles, and determine the length of the first time section based on the selected cycle.

(Supplementary Note 7)

The communication device according to supplementary note 6, in which the calculation means is configured to select a second smallest cycle from among the plurality of cycles.

(Supplementary Note 8)

The communication device according to any one of supplementary notes 1 to 7, in which on a basis of a communication setting in the optical communication network, the acquisition means is configured to classify the plurality of measurement values into a first group corresponding to the communication setting in the optical communication network among at least one first group based on a setting value of the communication setting, and on a basis of the measurement values included in the first group corresponding to the communication setting, the calculation means is configured to calculate the average value and determine the variance.

(Supplementary Note 9)

The communication device according to supplementary note 8, in which, on a basis of the average value and the variance, the calculation means is configured to classify the average value and the variance, among at least one second group based on a combination of a reference average value and a reference variance value, into a second group including the reference average value similar to the average value and the reference variance value similar to the variance, and calculate the reference quality value using the average value and variance included in the classified second group.

(Supplementary Note 10)

The communication device according to any one of supplementary notes 1 to 9, further including:

control means configured to change a communication setting in the optical communication network so that the communication quality satisfies the required quality value.

(Supplementary Note 11)

The communication device according to supplementary note 10, in which, when the communication quality satisfies the required quality value, the control means is configured to reduce a strength of an error correction code of a communication signal transmitted in the optical communication network or reduce a transmission output of another communication device that transmits the communication signal.

(Supplementary Note 12)

The communication device according to supplementary note 10, in which the control means is configured to change the communication setting by executing at least one of a first control in which a time from execution of the control to stabilization of the communication quality is a first stabilization time, or a second control in which a time from execution of the control to stabilization of the communication quality is a second stabilization time longer than the first stabilization time.

(Supplementary Note 13)

The communication device according to supplementary note 12, in which the control means is configured to determine whether the plurality of measurement values is constituted by a waveform that fluctuates in a cycle larger than a predetermined cycle through frequency analysis on the plurality of measurement values, and execute, when the plurality of measurement values is constituted by a waveform that fluctuates in a cycle larger than the predetermined cycle, at least one of the first control or the second control based on the cycle corresponding to the waveform.

(Supplementary Note 14)

The communication device according to supplementary note 13, in which the control means is configured to execute the second control when the cycle corresponding to the waveform is longer than the second stabilization time, and execute the first control when the cycle corresponding to the waveform is shorter than the second stabilization time.

(Supplementary Note 15)

The communication device according to any one of supplementary notes 12 to 14, in which the first control includes a control for changing at least one of a quadrature amplitude modulation (QAM) setting or a probabilistic constellation shaping (PCS) setting.

(Supplementary Note 16)

The communication device according to any one of supplementary notes 12 to 15, in which the second control includes a control for changing at least one of a frequency of a communication signal, an amplification power, or an optical switch setting in the optical communication network.

(Supplementary Note 17)

A communication control method including:

acquiring a plurality of measurement values related to communication quality information in an optical communication network;

calculating an average value of measurement values for each first time section based on the plurality of measurement values, determining a variance of the measurement values for each first time section, and determining a reference quality value based on the average value and the variance, the reference quality value being an index value indicating communication quality in the optical communication network; and determining whether the communication quality satisfies a required quality value based on the reference quality value.

(Supplementary Note 18)

A non-transitory computer-readable medium storing a program for causing a communication device to execute a communication control method, the communication control method including:

acquiring a plurality of measurement values related to communication quality information in an optical communication network;

calculating an average value of measurement values for each first time section based on the plurality of measurement values, determining a variance of the measurement values for each first time section, and determining a reference quality value based on the average value and the variance, the reference quality value being an index value indicating communication quality in the optical communication network; and determining whether the communication quality satisfies a required quality value based on the reference quality value.

REFERENCE SIGNS LIST

1, 101, 102, 103, 104, 201, 301, 401 COMMUNICATION DEVICE
2, 112, 312 ACQUISITION UNIT
3, 113, 213, 313 CALCULATION UNIT
4, 114 DETERMINATION UNIT
100 OPTICAL COMMUNICATION SYSTEM
105, 106 OPTICAL PACKET SWITCH
107, 108 TERMINAL DEVICE
P2 OPTICAL COMMUNICATION PATH
N1 OPTICAL COMMUNICATION NETWORK
111, 121 COMMUNICATION UNIT
115, 122, 415 CONTROL UNIT
116 STORAGE UNIT

What is claimed is:

1. A communication device comprising:

at least one memory storing instructions; and at least one processor configured to execute the instructions to:

acquire a plurality of measurement values related to communication quality information in an optical communication network;

calculate an average value of measurement values for each first time section based on the plurality of measurement values, determine a variance of the measurement values for each first time section, and determine a reference quality value based on the average value and the variance, the reference quality value being an index value indicating communication quality in the optical communication network; and determine whether the communication quality satisfies a required quality value based on the reference quality value, wherein the at least one processor is further configured to execute the instructions to change a communication setting in the optical communication network so that the communication quality satisfies the required quality value.

2. The communication device according to claim 1, wherein the at least one processor is further configured to execute the instructions to estimate a cumulative distribution function for the communication quality information based on the average value and the variance, calculate a margin value indicating a difference between the average value and a value of the communication quality information at which a cumulative probability has a predetermined value in the cumulative distribution function, and determine the reference quality value based on the average value and the margin value.

3. The communication device according to claim 1, wherein the at least one processor is further configured to execute the instructions to determine a set indicating times for determining the variance based on the average value, and determine the variance based on measurement values included in the set.

4. The communication device according to claim 3, wherein when a difference between an average value in a second time section among a plurality of first time sections and an average value in a third time section immediately before the second time section is smaller than or equal to a predetermined threshold value, the at least one processor is further configured to execute the instructions to determine the set so that the second time section is included in the set of first time sections.

5. The communication device according to claim 1, wherein the at least one processor is further configured to execute the instructions to perform frequency analysis on the plurality of measurement values, determine a length of the first time section based on an analysis result of the frequency analysis, and determine the variance based on measurement values for each first time section according to the determined length.

6. The communication device according to claim 5, wherein, on a basis of the analysis result of the frequency analysis, in a case where the plurality of measurement values is constituted by waveforms that fluctuate in a plurality of cycles, the at least one processor is further configured to execute the instructions to select one of the plurality of cycles, and determine the length of the first time section based on the selected cycle.

7. The communication device according to claim 6, wherein the at least one processor is further configured to execute the instructions to select a second smallest cycle from among the plurality of cycles.

8. The communication device according to claim 1, wherein on a basis of the communication setting in the optical communication network, the at least one processor is further configured to execute the instructions to classify the plurality of measurement values into a first group corresponding to the communication setting in the optical communication network among at least one first group based on a setting value of the communication setting, and on a basis of the measurement values included in the first group corresponding to the communication setting, the at least one processor is further configured to execute the instructions to calculate the average value and determine the variance.

9. The communication device according to claim 8, wherein, on a basis of the average value and the variance, the at least one processor is further configured to execute the instructions to classify the average value and the variance, among at least one second group based on a combination of a reference average value and a reference variance value, into a second group including the reference average value similar to the average value and the reference variance value similar to the variance, and calculate the reference quality value using the average value and variance included in the classified second group.

10. The communication device according to claim 1, wherein, when the communication quality satisfies the required quality value, the at least one processor is further configured to execute the instructions to reduce a strength of an error correction code of a communication signal transmitted in the optical communication network or reduce a transmission output of another communication device that transmits the communication signal.

11. The communication device according to claim 1, wherein the at least one processor is further configured to execute the instructions to change the communication setting by executing at least one of a first control in which a time from execution of the control to stabilization of the communication quality is a first stabilization time, or a second control in which a time from execution of the control to stabilization of the communication quality is a second stabilization time longer than the first stabilization time.

12. The communication device according to claim 11, wherein the at least one processor is further configured to execute the instructions to determine whether the plurality of measurement values is constituted by a waveform that fluctuates in a cycle larger than a predetermined cycle through frequency analysis on the plurality of measurement values, and execute, when the plurality of measurement values is constituted by a waveform that fluctuates in a cycle larger than the predetermined cycle, at least one of the first control or the second control based on the cycle corresponding to the waveform.

13. The communication device according to claim 12, wherein the at least one processor is further configured to execute the instructions to execute the second control when the cycle corresponding to the waveform is longer than the second stabilization time, and execute the first control when the cycle corresponding to the waveform is shorter than the second stabilization time.

14. The communication device according to claim 11, wherein the first control includes a control for changing at least one of a quadrature amplitude modulation (QAM) setting or a probabilistic constellation shaping (PCS) setting.

15. The communication device according to claim 11, wherein the second control includes a control for changing at least one of a frequency of a communication signal, an amplification power, or an optical switch setting in the optical communication network.

16. A communication control method comprising:

acquiring a plurality of measurement values related to communication quality information in an optical communication network;

calculating an average value of measurement values for each first time section based on the plurality of measurement values, determining a variance of the measurement values for each first time section, and determining a reference quality value based on the average value and the variance, the reference quality value being an index value indicating communication quality in the optical communication network, determining whether the communication quality satisfies a required quality value based on the reference quality value; and changing a communication setting in the optical communication network so that the communication quality satisfies the required quality value.

17. A non-transitory computer-readable medium storing a program for causing a communication device to execute a communication control method, the communication control method comprising:

acquiring a plurality of measurement values related to communication quality information in an optical communication network;

calculating an average value of measurement values for each first time section based on the plurality of measurement values, determining a variance of the measurement values for each first time section, and determining a reference quality value based on the average value and the variance, the reference quality value being an index value indicating communication quality in the optical communication network; and determining whether the communication quality satisfies a required quality value based on the reference quality value, hanging a communication setting in the optical communication network so that the communication quality satisfies the required quality value.

* * * * *